(12) United States Patent
Ikarashi

(10) Patent No.: US 12,452,042 B2
(45) Date of Patent: Oct. 21, 2025

(54) SECURE COMPUTATION APPARATUS, SECURE COMPUTATION METHOD, AND PROGRAM

(71) Applicant: NTT, INC., Tokyo (JP)

(72) Inventor: Dai Ikarashi, Musashino (JP)

(73) Assignee: NTT, Inc., Tokyo (JP)

( * ) Notice: Subject to any disclaimer, the term of this patent is extended or adjusted under 35 U.S.C. 154(b) by 208 days.

(21) Appl. No.: 17/791,907

(22) PCT Filed: Jan. 20, 2020

(86) PCT No.: PCT/JP2020/001681
§ 371 (c)(1),
(2) Date: Jul. 11, 2022

(87) PCT Pub. No.: WO2021/149104
PCT Pub. Date: Jul. 29, 2021

(65) Prior Publication Data
US 2022/0407682 A1    Dec. 22, 2022

(51) Int. Cl.
*H04L 9/08*       (2006.01)
*G09C 1/00*       (2006.01)

(52) U.S. Cl.
CPC ............... *H04L 9/085* (2013.01); *G09C 1/00* (2013.01)

(58) Field of Classification Search
CPC ............. H04L 9/085; H04L 9/16; G09C 1/00
See application file for complete search history.

(56) References Cited

U.S. PATENT DOCUMENTS

| | | | |
|---|---|---|---|
| 2017/0365192 A1* | 12/2017 | Ikarashi | G09C 1/00 |
| 2018/0011996 A1* | 1/2018 | Dolev | G06F 21/14 |
| 2018/0225431 A1* | 8/2018 | Ikarashi | G06F 21/30 |
| 2018/0373834 A1* | 12/2018 | Cho | G16B 50/30 |
| 2019/0228299 A1* | 7/2019 | Chandran | G06N 3/04 |
| 2020/0366466 A1* | 11/2020 | Ikarashi | G09C 1/00 |
| 2021/0287573 A1* | 9/2021 | Hamada | H04L 9/0894 |

FOREIGN PATENT DOCUMENTS

WO    2019/225531 A1    11/2019

OTHER PUBLICATIONS

Ikarashi, "Secure Real Number Operations for Secure AI—O(lpl)-Bit Communication and O(1)-Round Right Shift Protocol-", CSS2019, 2019, 16 pages including English Translation.

(Continued)

*Primary Examiner* — Farid Homayounmehr
*Assistant Examiner* — Mudasiru K Olaegbe
(74) *Attorney, Agent, or Firm* — XSENSUS LLP

(57) ABSTRACT

A secret share value $[y]=[\delta x^2+ax]$ is obtained through secure computation using a secret share value $[x]$ of a real number $x$, and a secret share value $[\text{func}(x)]=[y(\zeta y+b)+cx]$ of an elementary function approximation value $z=\text{func}(x)$ of the real number $x$ is obtained and output through secure computation using secret share values $[x]$ and $[y]$. Here, $x$, $y$, and $z$ are real numbers, $a$, $b$, $c$, $\delta$, and $\zeta$ are real number coefficients, and a secret share value of $\cdot$ is $[\cdot]$.

12 Claims, 7 Drawing Sheets

(56) References Cited

OTHER PUBLICATIONS

Toomas Krips et al., "Hybrid Model of Fixed and Floating Point Numbers in Secure Multiparty Computations", ICAR, International Association for Cryptologic Research, Dec. 23, 2014, total 24 pages.
Abdelrahaman Aly et al., "Benchmarking Privacy Preserving Scientific Operations", ACNS 2019, LNCS 11464, 2019, pp. 509-529, total 21 pages.
Mehrdad Aliasgari et al., "Secure Computation on Floating Point Numbers", IACR, International Association for Cryptologic Research, 2012, total 27 pages.

* cited by examiner

| PARAMETERS | RECIPROCAL | SQUARE ROOT | RECIPROCAL OF SQUARE ROOT | EXPONENT | LOGARITHM |
|---|---|---|---|---|---|
| L | 0.75 | 1 | 0.5 | 0 | 2 |
| R | 1.125 | 2 | 1 | 2 | 4 |
| a | -2.110464393239280 | -0.428141400291061 | -1.696628555353 | 0.015024536390913 | -0.846696273121107 |
| b | 2.434960779692272 | 0.410120079876874 | 1.549574093768800 | 0.409852775321580 | 0.784702951333529 |
| c | -0.184132172881249 | -0.012030958432748 | -0.110156883653438 | 0.218572247867126 | -0.035325936606200 |
| d | 9.889932879969575 | -3.717956726390170 | 4.697457088853176 | 6.648269572084330 | -3.026502814095830 |
| f | 1.843813235553150 | -0.643779936629560 | 0.910418285014127 | -0.737980772377752 | -0.522687484745320 |
| g | -2.074844182182560 | 0.447097638921850 | -0.959053601554654 | -0.580995576157224 | 0.378082178902487 |
| h | 9.792700357955590 | 0.232903741490693 | 3.971290599909928 | 1.000000000300262 | -1.687553742176250 |
| i | -1.113514988782710 | -0.366610117286381 | -0.523183544290677 | 0 | 0 |
| j | 1 | 0 | 0 | 0.5 | -1.433789157834340 |
| k | 0 | 0 | -0.25 | 1 | 0 |
| s | -0.568915141306530 | -0.106711930503672 | -0.503025809551099 | -0.470402400605697 | 0 |
| m | 16 | 0 | 0 | 0 | -0.748724878178412 |
| n | -4 | 0 | 0 | 20 | 0 |
| o | 2 | 0 | 0 | 0 | 0 |
| p | 11.242088745777100 | 0.765 | -2.971290599909928 | -4 | 2.38 |
| q | 2.6875 | -14.25 | 3 | -0.105107110464577 | -1.75 |
| α | -0.90625 | 0.125 | -0.5 | 3.875 | 0.0625 |
| β | 1.378714399910870 | 1.074207336578230 | 1.031634745737520 | 0.4375 | 1.033061782443710 |
| γ^-1 | 1 | 2^-3 | 1 | 0.901983541508680 | 2^-3 |
| δ | 1 | 2^-1 | 1 | 2^-3 | 2^-2 |
| ζ | 28 | 28 | 28 | 2^-2 | 27 |
| ex | 29 | 29 | 30 | 28 | 28 |
| ey | 29 | 29 | 30 | 29 | 28 |
| ez | 27 | 28 | 28 | 29 | 28 |
| ew | 61 | 62 | 62 | 27 | 61 |
| e'y | 63 | 64 | 63 | 60 | 62 |
| e'x | 63 | 60 | 60 | 61 | 59 |
| e'w |  |  |  |  |  |

FIG. 6

SECURE COMPUTATION APPARATUS, SECURE COMPUTATION METHOD, AND PROGRAM

CROSS-REFERENCE TO RELATED APPLICATION

The present application is based on PCT filing PCT/JP2020/001681, filed Jan. 20, 2020, the entire contents of which are incorporated herein by reference.

TECHNICAL FIELD

The present disclosure relates to a technology for approximating an elementary function of a real number in secure computation.

BACKGROUND ART

In recent years, research on advanced statistics and machine learning using secure computation has been actively performed. However, most operations thereof include calculations of elementary functions such as a reciprocal function, a square root function, an exponential function, and a logarithmic function, that go beyond addition, subtraction, and multiplication that are good for secure computation. These are extremely severe obstacles from the viewpoint of making applied research of secure computation flourish.

NPL 1 discloses a method of calculating an elementary function such as a reciprocal, a square root and a reciprocal thereof, and an exponential function in secure computation.

CITATION LIST

Non Patent Literature

NPL 1: Dai Ikarashi, "Secure Real Number Operations for Secure AI-O(|p|)-Bit Communication and O(1)-Round Right Shift Protocol-", CSS2019, 2019.

SUMMARY OF THE INVENTION

Technical Problem

However, in a method described in NPL 1, different schemes must be selected and applied according to characteristics of a function.

The present disclosure has been made in view of such a point, and an object of the present disclosure is to provide a secure computation technology capable of supporting many elementary functions for general purpose only by changing parameters.

Means for Solving the Problem

A secret share value $[y]=[\delta x^2+ax]$ is obtained through secure computation using a secret share value $[x]$ of a real number x, and a secret share value $[func(x)]=[y(\zeta y+b)+cx]$ of an elementary function approximation value $z=func(x)$ of the real number x is obtained and output through secure computation using the secret share value $[x]$ and the secret share value $[y]$. Here, x, y, and z are real numbers, a, b, c, $\delta$, and $\zeta$ are real number coefficients, and a secret share value of $\cdot$ is $[\cdot]$.

Effects of the Invention

In the present disclosure, many elementary functions can be subjected to secure computation for general purposes only by changing parameters.

BRIEF DESCRIPTION OF DRAWINGS

FIG. 6 is a table illustrating calculated parameters regarding each elementary function.

DESCRIPTION OF EMBODIMENTS

Hereinafter, embodiments of the present disclosure will be described with reference to the drawings.

First Embodiment

A first embodiment will be described. In the present embodiment, elementary functions are approximated by a polynomial and secure computation is performed. Thus, many elementary functions can be subjected to secure computation for general purposes only by changing parameters. Further, the elementary functions handled in the present embodiment are not limited, but when exponential functions or logarithmic functions are approximated by a polynomial, higher-order coefficients become very small. In such a case, when the approximation is performed using only one polynomial, approximation precision of coefficients is degraded. Thus, in the present embodiment, a plurality of polynomials are used to gradually decrease a higher order. An elementary function is a one-variable function of a real number or a complex number, and is a function obtained by repeating creation of an algebraic function, an exponential function, a logarithmic function, a triangular function, an inverse triangular function, and a composite function thereof a finite number of times. Examples of the elementary function are a reciprocal function, a square root function, an exponential function, and a logarithmic function.

Figure 1A:
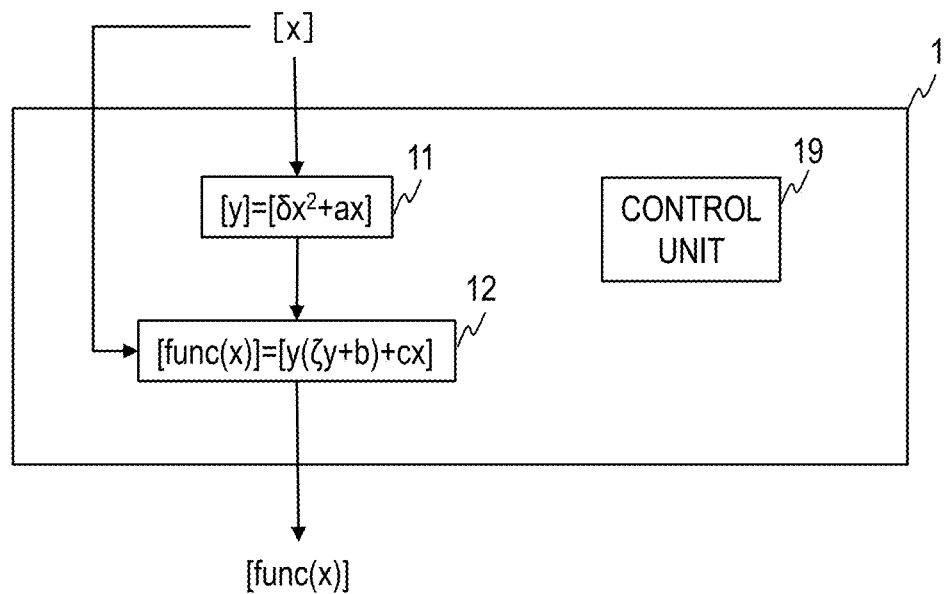
FIG. 1A is a block illustrating a secure computation device of a first embodiment.

As illustrated in FIG. 1A, a secure computation device 1 of the first embodiment includes secure computation units 11 and 12 and a control unit 19. The secure computation device 1 executes each processing under the control of the control unit 19. Hereinafter, x, y, and z are real numbers, and a, b, c, $\delta$, and $\zeta$ are real number coefficients. The real number coefficients a, b, c, $\delta$, and $\zeta$ are set according to a desired elementary function. A secret share value of $\cdot$ is $[\cdot]$. A secret sharing scheme is not limited, and examples thereof include an additive secret sharing scheme and a Shamir's secret sharing scheme. An example of [·] is a secret share value obtained by performing linear secret sharing on an element · on a quotient ring. Further, a public decimal point position is defined for an integer on the ring so that this can be regarded as a fixed-point real number. In the embodiment, the fixed-point real number indicated on the ring in this way is simply expressed as a real number.

Figure 1B:
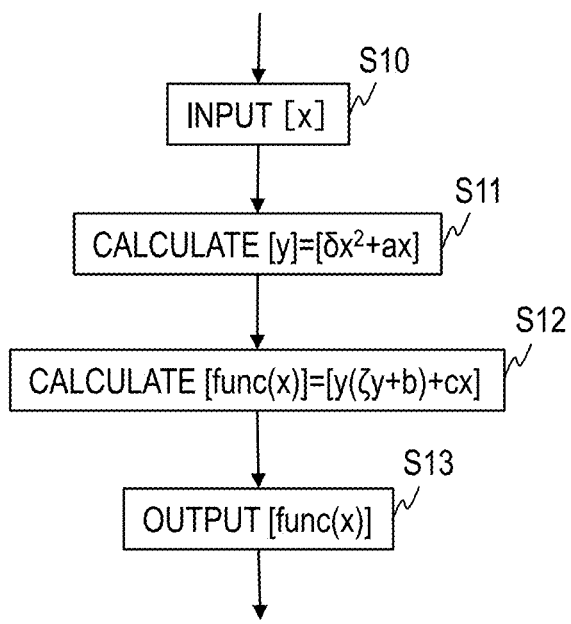
FIG. 1B is a flow diagram illustrating a secure computation method of the first embodiment.

As illustrated in FIG. 1B, first, a secret share value [x] of a real number x is input to the secure computation device 1 (step S10).

The secret share value [x] is input to the secure computation unit 11. The secure computation unit 11 obtains and outputs a secret share value $[y]=[\delta x^2+ax]$ through secure computation using the secret share value [x] (step S11).

The secret share values [x] and [y] are input to the secure computation unit 12. The secure computation unit 12 obtains and outputs a secret share value $[func(x)]=[y(\zeta y+b)+cx]$ of an elementary function approximation value $z=func(x)$ of the real number x through secure computation using the secret share value [x] and the secret share value [y] (step S12).

The secure computation unit 11 outputs the secret share value [func(x)] (step S13).

Second Embodiment

In the first embodiment, the elementary function is approximated by a fourth-order polynomial, whereas in a second embodiment, the elementary function is approximated by an eighth-order polynomial. Hereinafter, differences from matters described so far will be mainly described and common matters will be briefly described.

Figure 2A:
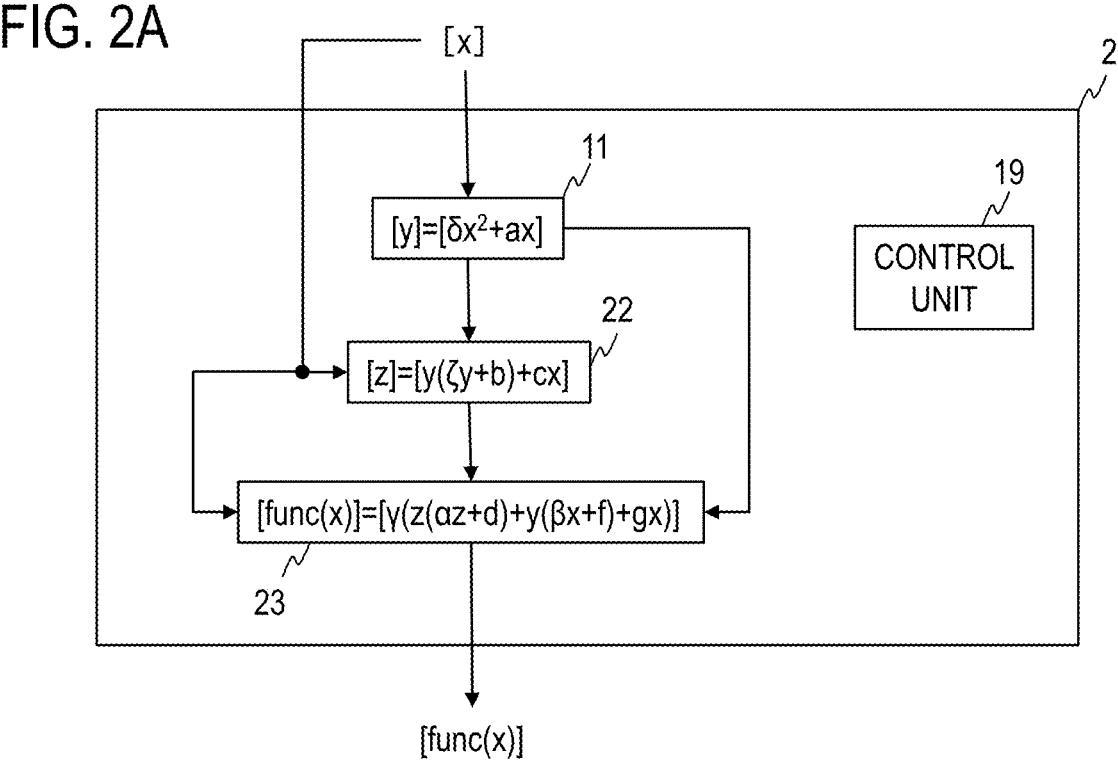
FIG. 2A is a block illustrating a secure computation device of a second embodiment.

As illustrated in FIG. 2A, a secure computation device 2 of the second embodiment includes secure computation units 11, 22, and 23 and a control unit 19. The secure computation device 2 executes each processing under the control of the control unit 19. Hereinafter, x, y, z, and w are real numbers, and a, b, c, d, f, g, $\alpha$, $\beta$, $\gamma$, $\delta$, and $\zeta$ are real number coefficients. The real number coefficients a, b, c, d, f, g, $\alpha$, $\beta$, $\gamma$, $\delta$, and $\zeta$ are set according to a desired elementary function.

Figure 2B:
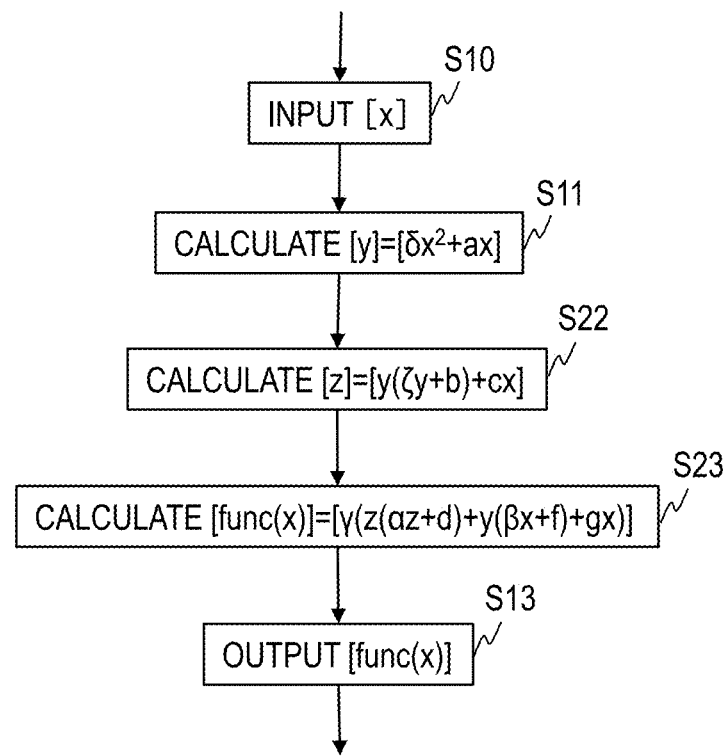
FIG. 2B is a flow diagram illustrating a secure computation method of the second embodiment.

As illustrated in FIG. 2B, first, a secret share value [x] of a real number x is input to the secure computation device 2 (step S10).

The secret share value [x] is input to the secure computation unit 11. The secure computation unit 11 obtains and outputs a secret share value $[y]=[\delta x^2+ax]$ through secure computation using the secret share value [x] (step S11).

The secret share values [x] and [y] are input to the secure computation unit 22. The secure computation unit 22 obtains and outputs the secret share value $[z]=[y(\zeta y+b)+cx]$ through secure computation using the secret share value [x] and the secret share value [y] (step S22).

The secret share values [x], [y], and [z] are input to the secure computation unit 23. The secure computation unit 23 obtains and outputs a secret share value $[func(x)]=[\gamma(z(\alpha z+d)+y(\beta x+f)+gx)]$ of an elementary function approximation value $w=func(x)$ of the real number x through secure computation using the secret share value [x], the secret share value [y], and the secret share value [z] (step S23).

The secure computation device 2 outputs the secret share value [func(x)] (step S13).

Third Embodiment

In a third embodiment, an elementary function is approximated by a fourth-order polynomial, as in the first embodiment, but the third embodiment differs from the first embodiment in that a highest-order coefficient can be set.

Figure 3A:
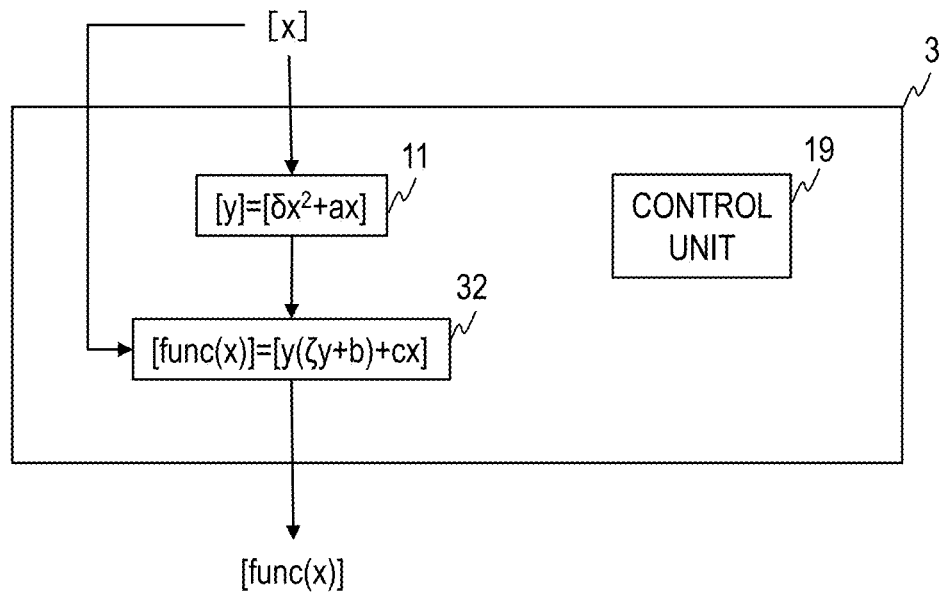
FIG. 3A is a block illustrating a secure computation device of a third embodiment.

As illustrated in FIG. 3A, the secure computation device 3 of the third embodiment includes secure computation units 11 and 32 and a control unit 19. The secure computation device 3 executes each processing under the control of the control unit 19. Hereinafter, x, y, and z are real numbers, and a, b, c, $\gamma$, $\delta$, and $\zeta$ are real number coefficients. The real number coefficients a, b, c, $\gamma$, $\delta$, and $\zeta$ are set according to a desired elementary function.

Figure 3B:
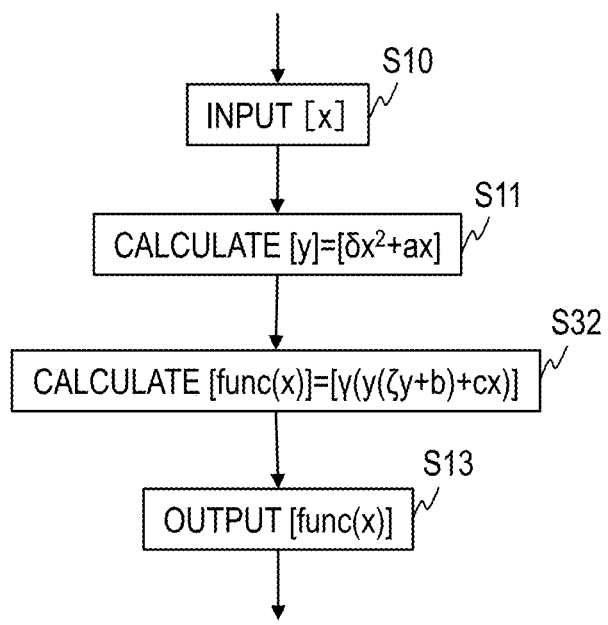
FIG. 3B is a flow diagram illustrating a secure computation method of the third embodiment.

As illustrated in FIG. 3B, first, the secret share value [x] of the real number x is input to the secure computation device 3 (step S10).

The secret share value [x] is input to the secure computation unit 11. The secure computation unit 11 obtains and outputs a secret share value $[y]=[\delta x^2+ax]$ through secure computation using the secret share value [x] (step S11).

The secret share values [x] and [y] are input to the secure computation unit 32. The secure computation unit 32 obtains and outputs a secret share value $[func(x)]=[\gamma(y(\zeta y+b)+cx)]$ of an elementary function approximation value $z=func(x)$ of the real number x through secure computation using the secret share value [x] and the secret share value [y] (step S32).

The secure computation unit 31 outputs the secret share value [func(x)] (step S13).

Modification Examples of First to Third Embodiments

The secure computation device may approximate a desired elementary function with a polynomial function $f_t(x)=func(x)$, calculate a secret share value $[f_t(x)-f'_t(x)]$ of a difference $f_t(x)-f'_t(x)$ between a function $f_t(x)$ before right shift and an approximation function $f'_u(x)$ of the function $f_t(x)$, obtain a secret share value $[f_t(x)-f'_t(x)]_r$ of $(f_t(x)-f'_t(x))_r$ obtained by right-shifting $f_t(x)-f'_t(x)$, and obtain a secret share value $[f_t(x)]$ of the function $f_t(x)$ obtained by adding $f'_t(x)$ to $f_t(x)-f'_t(x)$ through secure computation of the secret share value $[f_t(x)-f'_t(x)]_r$ and the secret share value $[f'_t(x)]$. Here, x is a real number, [·] is a secret share value of ·, n is an integer equal to or greater than 1 (for example, n is an integer equal to or greater than 2), $t=0, \ldots, n-1$, $u=1, \ldots, n-1$, $f_t(x)$ is a function of a real number x, $f'_t(x)$ is an approximation function of the function $f_t(x)$, a secret share value $[f'_0(x)]$ of the approximation function $f'_0(x)$ is $[f'_0(x)]=c_{0,\,0}+c_{0,\,1}[x]$, a secret share value $[f'_u(x)]$ of an approximation function $f'_u(x)$ is $[f'_u(x)]=c_{u,\,0}+c_{u,\,1}[x]+c_{u,\,2}[f_0(x)]+\ldots+[f_{u-1}(x)]$, $c_{t,\,0}$ is a public value, and $c_{t,\,1}, \ldots, c_{t,\,n+1}$ are coefficients. Here, $c_{t,\,1}, \ldots, c_{t,\,n+1}$ are values with small effective numbers of bits and are values that do not require a shift due to overflow even when $c_{t,\,1}, \ldots, c_{t,\,n+1}$ is multiplied. $f_t(x)-f'_t(x)$ is positive. A secret sharing scheme is not limited, and examples thereof include an additive secret sharing scheme and a Shamir's secret sharing scheme. Here, because a magnitude of $f_t(x)-f'_t(x)$ is smaller than a magnitude of $f_t(x)$, it is possible to curb an overflow of the secret share value $[f_t(x)-f'_t(x)]$. Further, because the secret share value $[f_t(x)-f'_t(x)]$ of the difference $f_t(x)-f'_t(x)$ between the function $f_t(x)$ before right shift and the approximation function $f'_u(x)$ of the function $f_t(x)$ is calculated, it is possible to maintain high precision. The overflow is a problem based on performance of a processor in which the secure computation is implemented, and the present scheme provides a scheme for solving a problem based on constraints on this hardware. Thus, the present scheme does not solve pure mathematics problems, but solves hardware implementation problems, and therefore has technical characteristics. For example, technical characteristics of the processor that overflows when the secret share value $[f_r(x)]$ is calculated but does not overflow when the secret share value $[f_r(x)-f'_r(x)]$ is calculated are remarkable. Hereinafter, modification examples of the first to third embodiments will be specifically shown.

Modification Example of First Embodiment

In the case of the first embodiment, n=2, a, b, c, δ, i, j, k, s, and m are real numbers, $f_0(x)=y=\delta x^2+ax$, $f_1(x)=z=y(\zeta y+b)+cx$, $f_2(x)=w=\gamma(z(\alpha z+d)+y(\beta x+f)+gx)$, $f'_0(x)=ix+j$, $f'_1(x)=ky+sx+m$, and $f'_2(x)=nz+oy+px+q$.

Input: $[x]\in[L, R)$
Set parameters: a, b, c, δ, i, j, k, s, and m
Output: Secret share value $[func(x)]$ 1: The secret share value $[x]$ is input to the secure computation device 1 (step S10). The secure computation unit 11 of the secure computation device 1 obtains a secret share value $[y']=[x(\delta x+a-i)-j]$ through the secure computation of the sum of products using the secret share value $[x]$, and obtains a secret share value $[y']_r$ of $y'_r$ of which a decimal point position is lowered through secure computation of right shift (step S11).

2: The secure computation unit 11 obtains the secret share value $[y]=[y'+(ix+j)]$ through secure computation using the secret share values $[y']_r$ and $[x]$ (step S11).

3: The secure computation unit 12 obtains a secret share value $[z']=[y(\zeta y+b-k)+(c-s)x-m]$ through secure computation of a sum of products using the secret share values $[x]$ and $[y]$, and obtains a secret share value $[z']_r$ of $z'_r$ of which a decimal point position is lowered through right shift (step S12).

4: The secure computation unit 12 obtains a secret share value $[func(x)]=[z'+(ky+sx+m)]$ through secure computation using the secret share value $[z']_r$ (step S12). The secure computation unit 12 outputs the obtained secret share value $[func(x)]$ (step S13).

Modification Example of Second Embodiment

In the case of the second embodiment, n=3, and a, b, c, d, f, g, h, i, j, k, s, m, n, o, p, q, α, β, γ, δ, and ζ are real numbers, $f_0(x)=y=\delta x^2+ax$, $f_1(x)=Z=y(\zeta y+b)+cx$, $f_2(x)=w=\gamma(z(\alpha z+d)+y(\beta x+f)+gx)$, $f'_0(x)=ix+j$, $f'_1(x)=ky+sx+m$, and $f'_2(x)=nz+oy+px+q$.

Input: $[x]\in[L, R)$
Set parameters: a, b, c, d, f, g, H, i, j, k, s, m, n, o, p, q, α, β, γ, δ, and ζ
Output: Secret share value $[func(x)]$ 1: The secret share value $[x]$ is input to the secure computation device 2 (step S10). The secure computation unit 11 of the secure computation device 2 obtains a secret share value $[y']=[x(\delta x+a-i)-j]$ through the secure computation of the sum of products using the secret share value $[x]$, and obtains a secret share value $[y']_r$ of $y'_r$ of which a decimal point position is lowered through secure computation of right shift (step S11).

2: The secure computation unit 11 obtains the secret share value $[y]=[y'+(ix+j)]$ through secure computation using the secret share values $[y']_r$ and $[x]$ (step S11).

3: The secure computation unit 22 obtains a secret share value $[z']=[y(\zeta y+b-k)+(c-s)x-m]$ through secure computation of a sum of products using the secret share values $[x]$ and $[y]$, and obtains a secret share value $[z']_r$ of $z'_r$ of which a decimal point position is lowered through right shift (step S22).

4: The secure computation unit 22 obtains a secret share value $[z]=[z'+(ky+sx+m)]$ through secure computation using the secret share values $[z']_r$, $[x]$, and $[y]$ (step S22).

5: The secure computation unit 23 obtains a secret share value $[w'/\gamma]=[z(\alpha z+d-n/\gamma)+(\beta x+f-o/\gamma)y+(g-p)x+(H-q)/\gamma]$ through secure computation of a sum of products using the secret share values $[x]$, $[y]$, and $[z]$, and performs multiplication by γ and lowering of the decimal point position to obtain a secret share value $[w']$ (step S23). Processing for obtaining the secret share value $[w']$ is not limited. For example, the secure computation unit 23 may obtain a public value $2^\sigma/\gamma$, and obtain a secret share value $[w']_r$ through secure computation of public value division $[w'/\gamma]/(2^\sigma/\gamma)$ using the public value $2^\sigma/\gamma$ and the secret share value $[w'/\gamma]$. Here, σ is a positive integer indicating an amount of right shift. Thus, because the multiplication of γ and the secure computation of the right shift can be executed at the same time, a processing cost can be reduced.

6: The secure computation unit 23 obtains a secret share value $[func(x)]=[w'+(nz+oy+px+q)]$ through secure computation (step S23). The secure computation unit 23 outputs the obtained secret share value $[func(x)]$ (step S13).

Modification Example of Third Embodiment

In the case of the third embodiment, n=2, a, b, c, γ, δ, i, j, k, s, and m are real numbers, $f_0(x)=y=\delta x^2+ax$, and $f_1(x)=z=\gamma(y(\delta y+b)+cx)$, $f'_0(x)=ix+j$, and $f'_1(x)=ky+sx+m$.

Input: $[x]\in[L, R)$
Set parameters: a, b, c, γ, δ, i, j, k, s, and m
Output: Secret share value $[func(x)]$ 1: The secret share value $[x]$ is input to the secure computation device 3 (step S10). The secure computation unit 31 of the secure computation device 3 obtains a secret share value $[y']=[x(\delta x+a-i)-j]$ through the secure computation of the sum of products using the secret share value $[x]$, and obtains a secret share value $[y']_r$ of $y'_r$ of which a decimal point position is lowered through secure computation of right shift (step S11).

2: The secure computation unit 31 obtains the secret share value $[y]=[y'+(ix+j)]$ through secure computation using the secret share value $[y']_r$ (step S11).

3: The secure computation unit 32 obtains $[z'/\gamma]=[y(\zeta y+b-k/\gamma)+(c-s/\gamma)x-m/\gamma]$ through secure computation of a sum of products using the secret share values $[x]$ and $[y]$ (step S32).

4: The secure computation unit 32 obtains a secret share value $[z']_r$ of $z'_r$ obtained by right-shifting $z'_r$ by a predetermined number of bits, obtained by multiplying $z'/\gamma$ by γ through secure computation using the secret share value $[z'/\gamma]$ (step S32). Processing for obtaining the secret share value $[z']_r$ is not limited, but for example, the secure computation unit 32 may obtain the public value $2^\sigma/\gamma$, and obtain the secret share value $[z']_r$ through secure computation of public value division $[z'/\gamma]/(2^\sigma/\gamma)$ using the public value $2^\sigma/\gamma$ and the secret share value $[z'/\gamma]$. Thus, because the multiplication of γ and the secure computation of the right shift can be executed at the same time, a processing cost can be reduced.

5: The secure computation unit 32 obtains a secret share value $[func(x)]=[z'+(ky+sx+m)]$ through secure computation using the secret share value $[z']_r$ and the secret share values $[x]$ and $[y]$ (step S32). The secure computation unit 32 outputs the obtained secret share value $[func(x)]$ (step S13).

Fourth Embodiment

Figure 4:
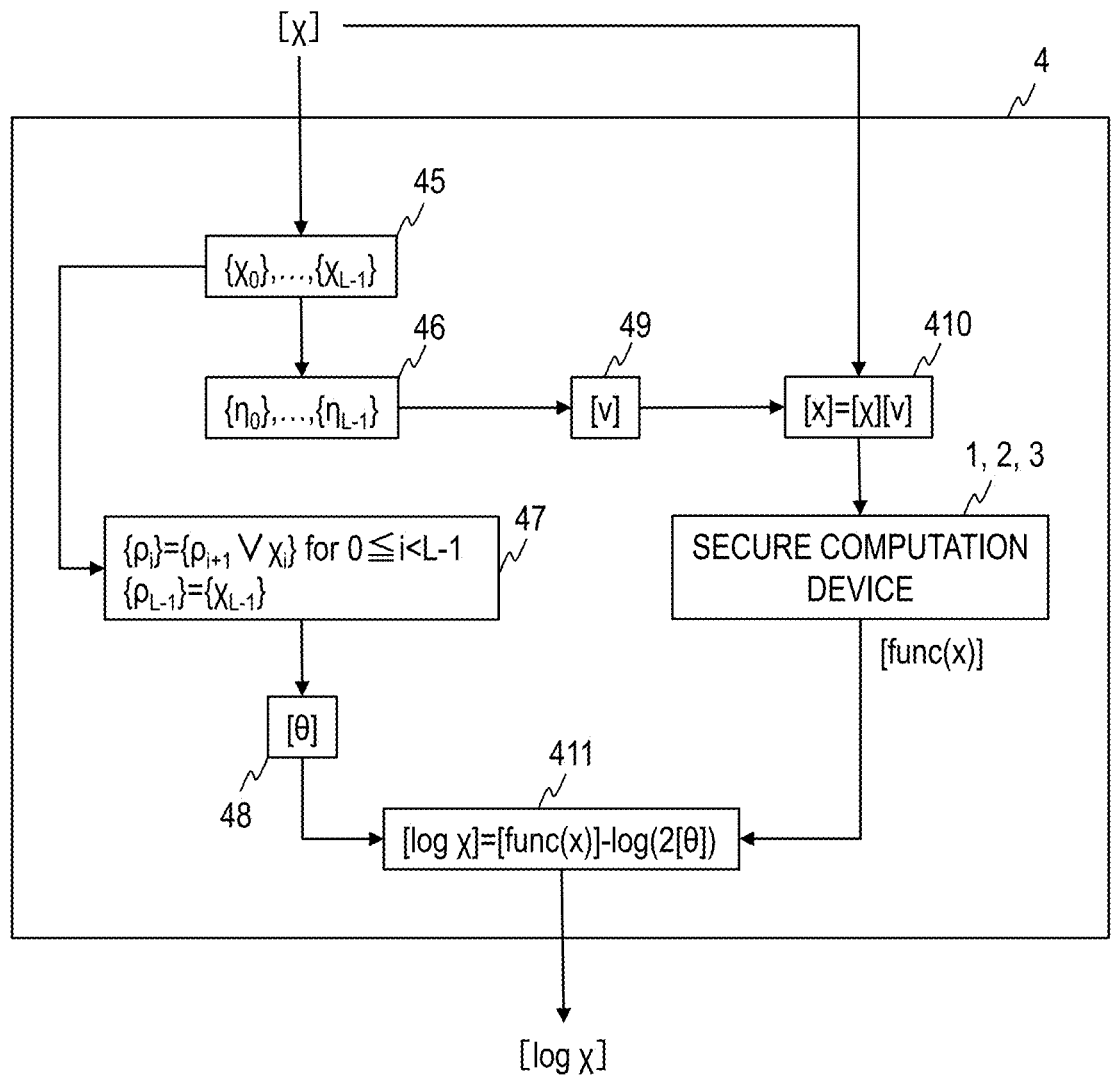
FIG. 4 is a block illustrating a secure computation device of a fourth embodiment.

In a fourth embodiment, a logarithmic function is approximated as an elementary function. As illustrated in FIG. 4, a secure computation device 4 of the fourth embodiment includes secure computation units 45, 46, 47, 48, 49, 410, and 411, and any one of the secure computation devices 1 to 3 or the secure computation device of the modification example described above. Hereinafter, $\chi$ is a real number, p is a positive integer, L is an integer equal to or greater than 2, [·] is a secret share value obtained by performing linear secret sharing on an element · on a quotient ring modulo p, and {·} is a secret share value obtained by performing linear secret sharing on an element · on a quotient ring modulo 2.

Figure 5:
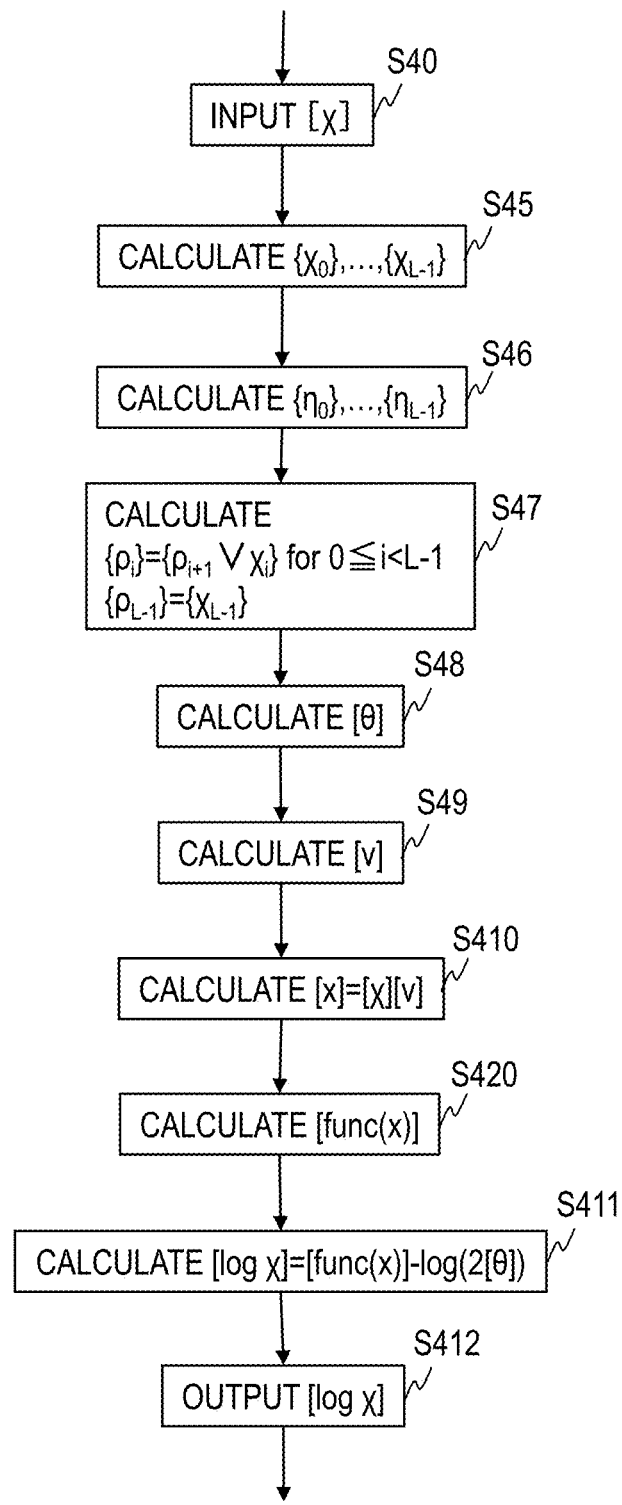
FIG. 5 is a flow diagram illustrating a secure computation method of the fourth embodiment.

As illustrated in FIG. 5, first, a secret share value [$\chi$] of a real number $\chi$ is input to the secure computation device 4 (step S40).

The secret share value [$\chi$] is input to the secure computation unit 45. The secure computation unit 45 obtains and outputs secret share values $\{\chi_0\}, \ldots, \{\chi_{L-1}\}$ of an L-bit representation $\chi_0 \ldots \chi_{L-1}$ of the real number $\chi$ through secure computation using the secret share value [$\chi$] (step S45). $\chi_0, \ldots, \chi_{L-1}$ are integers.

The secret share values $\{\chi_0\}, \ldots, \{\chi_{L-1}\}$ are input to the secure computation unit 46. The secure computation unit 46 obtains and outputs secret share values $\{\eta_0\}, \ldots, \{\eta_{L-1}\}$ of the msb flag sequence $\eta_0, \ldots, \eta_{L-1}$ in which a bit $\eta_{msb}$ corresponding to a most significant bit (msb) $\chi_{msb}$ of a bit sequence $\chi_0 \ldots \chi_{L-1}$ is 1 and bits $\eta\xi(\xi \in \{0, \ldots, L-1\})$ other than the bit $\eta_{msb}$ are 0, through secure computation using the secret share values $\{\chi_0\}, \ldots, \{\chi_{L-1}\}$ (step S46). Details of step S46 will be described below.

The secret share values $\{\chi_0\}, \ldots, \{\chi_{L-1}\}$ are input to the secure computation unit 47. The secure computation unit 47 performs secure computation using the secret share values $\{\chi_0\}, \ldots, \{\chi_{L-1}\}$ to obtain and output a secret share value $\{\rho_i\}=\{\rho_{i+1} \vee \chi_i\}$ where $0 \leq i < L-1$ and a secret share value $\{\rho_{L-1}\}=\{\chi_{L-1}\}$ (step S47). Details of step S47 will be described below.

The secret share values $\{\rho_0\}, \ldots, \{\rho_{L-1}\}$ are input to the secure computation unit 48. The secure computation unit 48 obtains and outputs a secret share value [θ] of a count value θ indicating the number of elements that are 1 among $\rho_0, \ldots, \rho_{L-1}$ through secure computation using the secret share values $\{\rho_0\}, \ldots, \{\rho_{L-1}\}$ (step S48).

The secret share values $\{\eta_0\}, \ldots, \{\eta_{L-1}\}$ are input to the secure computation unit 49. The secure computation unit 49 obtains and outputs a secret share value [v] of a msb flag value $v=\eta_0 \ldots \eta_{L-1}$ obtained by bit-connecting the msb flag sequence $\eta_0, \ldots, \eta_{L-1}$ through secure computation using the secret share values $\{\theta_0\}, \ldots, \{\eta_{L-1}\}$ (step S49).

The secret share values [$\chi$] and [v] are input to the secure computation unit 410. The secure computation unit 410 obtains and outputs a secret share value [x]=[$\chi$][v] through secure computation using the secret share value [$\chi$] and the secret share value [v] (step S410).

The secret share value [x] is input to any one of the secure computation devices 1 to 3. Any one of the secure computation devices 1 to 3 or the secure computation device of the modification examples thereof to which the secret share value [x] has been input obtains and outputs a secret share value [func(x)] through processing of the first to third embodiments or the modification examples thereof (step S420).

The secret share values [func(x)] and [θ] are input to the secure computation unit 411. The secure computation unit 411 obtains and outputs [log $\chi$]=[func(x)]−[θ] through secure computation using the secret share value [func(x)] and the secret share value [θ] (step S411).

The secure computation device 4 outputs a secret share value [log $\chi$] (step S412).

Details of Steps S46 and S47
Input: Secret share values $\{\chi_0\}, \ldots, \{\chi_{L-1}\}$
Output: Secret share values $\{\eta_0\}, \ldots, \{\eta_{L-1}\}$
1: The secure computation unit 46 sets $\{\rho_i\}=\{\rho_{i+1} \vee \chi_i\}$ where $0 \leq i < L-1$.
2: The secure computation unit 46 sets $\{\rho_{L-1}\}=\{\chi_{L-1}\}$.
Up to this point, $\rho_0, \ldots, \rho_{L-1}$ is a bit sequence in which bits below msb are 1 and bits above msb are 0, such as 0, 0, 0, 1, 1, . . . , 1.
3: The secure computation unit 46 sets $\{\eta_i\}=\{\rho_i$ (XOR) $\rho_{i+1}\}$ where $0 \leq i < L-1$. Here, α1 (XOR) α2 indicates an exclusive OR of α1 and α2.
4: The secure computation unit 46 sets $\{\eta_{L-1}\}=\{\chi_{L-1}\}$.
Up to this point, in $\eta_0, \ldots, \eta_{L-1}$, only a bit at a position of msb is 1, and other bits are 0, such as 0, 0, 0, 1, 0, . . . , 0.

Fifth Embodiment

In a fifth embodiment, processing in a case in which an elementary function is a reciprocal function, a reciprocal function of a square root, a square root function, and an exponential function is illustrated.

EXAMPLE 1

Example of Reciprocal Function

In Example 1, a secret share value of a reciprocal function value $1/\chi$ of the real number $\chi$ is calculated. A positive integer indicating a difference between a decimal point position of a bit sequence of 0.5 when the input real number $\chi$ is expressed in binary and a most significant bit (msb) of $\chi$ is e, and the following modification is performed on the real number $\chi$.

$$\frac{1}{\chi} = 2^e \frac{1}{2^e \chi}$$

That is, processing of multiplying by $2^e$ to normalize to a section [0.5, 1), obtaining a reciprocal $$\frac{1}{2^e \chi},$$

and then multiplying by $2^e$ is performed in secure computation. For the reciprocal, when normalization to standard [0.5, 1) is performed, a precision is about 21 bits in an eighth-order polynomial approximation. Because 23-bit precision is required in single precision typically, it is necessary to introduce a technique for further improving the precision. Although, a leftmost bit is moved to normalize to [0.5, 1) normally, after that, when one bit below a leftmost bit is 0 (that is, when a value is [0.5, 0.75)), an operation of multiplication by 1.5 is performed. Then, because [0.5, 0.75) moves to [0.75, 1.125), normalization to [0.75, 1.125) is performed when considering that [0.75, 1) would do nothing. Because [0.75, 1.125) is a section narrower than [0.5, 1), the above operation is an effective technique in interpolation polynomial approximation of which the precision is improved as an approximation section is narrower.
Normalization Protocol for Reciprocal
Input: [$\chi$]
Output: [x], [v]
Here, when a decimal point position in a case in which $\chi$ is expressed in binary is ι, x is a value further multiplied by 1.5 when a bit that is one bit below msb of $\chi$ is 0 after msb of $\chi$ is moved to a position of ι. x is normalized to [0.75, 1.125). ν is a value satisfying x=χν.
1: The secure computation device obtains secret share values $\{\chi_0\}, \ldots, \{\chi_{L-1}\}$ of bit representations $\chi_0, \ldots, \chi_{L-1}$ corresponding to the bit sequence $\chi_0 \ldots \chi_{L-1}$ in a case in which $\chi$ is expressed in binary through bit decomposition by secure computation using the secret share value [χ].
2: The secure computation device obtains secret share values $\{\eta_0\}, \ldots, \{\eta_{L-1}\}$ of the msb flag sequence $\eta_0, \ldots, \eta_{L-1}$ in which a bit $\eta_{msb}$ corresponding to a most significant bit (msb) $\chi_{msb}$ of a bit sequence $\chi_0 \ldots \chi_{L-1}$ is 1 and bits $\eta\xi(\xi\in\{0,\ldots,L-1\})$ other than the bit $\eta_{msb}$ are 0, through secure computation using the secret share values $\{\chi_0\}, \ldots, \{\chi_{L-1}\}$. This processing is the same as in step S46 described above.
3: The secure computation device obtains $\{\chi_i\}=\{(\neg\chi_{i-1}2\hat{}\eta_{i-1})$ (XOR) $\eta_i\}$ where $2\le i<L$ through secure computation using the secret share values $\{\chi_0\}, \ldots, \{\chi_{L-1}\}$ and $\{\eta_0\}, \ldots, \{\eta_{L-1}\}$.
4: The secure computation device obtains secret share values $\{\chi_0\}=\{\omega_1\}=\{0\}$ and $\{\omega_L\}=\{\neg\eta_{L-2}\hat{}\eta_{L-1}\}$ through secure computation using the secret share values $\{\eta_0\}, \ldots, \{\eta_{L-1}\}$. When an input bit that is one bit below msb of the bit sequence $\chi_0 \ldots \chi_{L-1}$ is 1, $\omega_i$ that is one bit above msb is 1. In a next step, because upper and lower digits of $\{\omega_0\}, \{\omega_1\}, \{\omega_2\}, \ldots, \{\omega_{L-1}\}$ are reversed and combined, the upper and lower digits are reversed here and secret share values $\{\omega_0\}, \{\omega_1\}, \{\omega_2\}, \ldots, \{\omega_{L-1}\}$ are set.
5: The secure computation device connects $\{\omega_{L-1}\}, \ldots, \{\omega_0\}$ through bit connection by secure computation using the secret share values $\{\omega_0\}, \{\omega_1\}, \{\omega_2\}, \ldots, \{\omega_{L-1}\}$ to obtain and output [ν]. When ν is multiplied by χ, msb of χ is moved to a predetermined place, and ν is a number that multiplies 1.5 by χ when a bit that is one bit below msb of χ is 0.
6: The secure computation device obtains a secret share value [x]=[χ][ν].

Reciprocal Protocol
Input: [χ]
Output: [1/χ]
1: The secure computation device obtains a secret share value [x] of a value x obtained by normalizing the real number χ to [0.75, 1.125) and a secret share value [ν] to be multiplied by the secret share value [χ] for normalization through the above-described normalization protocol for a reciprocal.
2: The secure computation device obtains the secret share value [func(x)] from the secret share value [x] through secure computation. Here, func(x) in Example 1 is a polynomial for approximating a reciprocal function of x. The secure computation device uses, for example, methods of the first to third embodiments or a modification example thereof to obtain a secret share value [w]=[func(x)].
3: The secure computation device obtains and outputs secret share values [w] and [ν] through secure computation using the secret share values [w] and [ν].

EXAMPLE 2

Example of Reciprocal Function of Square Root

In Example 2, a secret share value of a reciprocal function value $1/\sqrt{\chi}$ of a square root of the real number χ is calculated. In a reciprocal function of the square root, normalization to [0.5, 1) is performed in the same way as the reciprocal function described above. Here, multiplication by $\sqrt{(2^e)}$ instead of $2^e$ is performed. In Example 2, the following modification is performed on the real number χ.

$$\frac{1}{\sqrt{\chi}} = \sqrt{2^e}\frac{1}{\sqrt{2^e\chi}}$$

That is, processing of multiplying the real number χ by $2^e$ so that the real number χ is normalized, obtaining a reciprocal of the square root of $2^e\chi$ $$\frac{1}{\sqrt{2^e\chi}},$$

and then multiplying the reciprocal by $\sqrt{(2^e)}$ is performed in secure computation.

Normalization Protocol for Reciprocal of Square Root
Input: [χ]
Output: [x], [φ], [ν']
Here, when a decimal point position when χ is expressed in binary is ι, x is a value obtained by moving msb of χ to a position of ι−1. In Example 2, φ is a truth value indicating whether it is necessary to multiply a calculated value by $\sqrt{2}$ at the end. ν' is a power of 2 to be multiplied at the end.
1: The secure computation device obtains secret share values $\{\chi_0\}, \ldots, \{\chi_{L-1}\}$ of bit representations $\chi_0, \ldots, \chi_{L-1}$ corresponding to the bit sequence $\chi_0 \ldots \chi_{L-1}$ in a case in which χ is expressed in binary through bit decomposition by secure computation using the secret share value [χ].
2: The secure computation device obtains L'=ceil(L/2). Here, ceil is a ceiling function.
3: The secure computation device obtains the secret share value $\{\chi'_i\}=\{\chi_iV_{\chi_{i+1}}\}$ where $0\le i<$floor(L/2) through the secure computation using the secret share values $\{\chi_0\}, \ldots, \{\chi_{L-1}\}$. Here, floor is a floor function.
4: The secure computation device sets $\{\chi'_{L'-1}\}=\{\chi_{L-1}\}$ when L is an odd number.
5: The secure computation unit obtains and outputs secret share values, $\{\eta_0\}, \ldots, \{\eta_{L'-1}\}$ of the msb flag sequence $\eta_0, \ldots, \eta_{L'-1}$ in which a bit $\eta_{msb}$ corresponding to a most significant bit (msb) χ'msb of a bit sequence $\chi'_0 \ldots \chi'_{L'-1}$ is 1 and bits $\eta\xi(\xi\in\{0,\ldots,L'-1\})$ other than the bit $\eta_{msb}$ are 0 through secure computation using the secret share values $\{\chi'_0\}, \ldots, \{\chi'_{L'-1}\}$. This processing is the same as step S46 in which $\chi_i$ is $\chi'_i$ and L is L' described above.
6: The secure computation unit obtains and outputs a secret share value [ν'] of the msb flag value ν' bit-connected an msb flag sequence $\eta_{L'-1}, \ldots, \eta_0$ through bit-connection in secure computation using secret share values $\{\eta_0\}, \ldots, \{\eta_{L'-1}\}$.
7: The secure computation unit sets $\{\chi''_i\}=\{\chi_{2i}\}$ where $0\le i<$floor(L/2).
8: When L is an odd number, the secure computation unit sets $\{\chi''_{L'-1}\}=\{\chi_{L-1}\}$.
9: The secure computation unit obtains a secret share value $\{\phi\}=\{\eta_0\chi''_0+\ldots+\eta_{L'-1}\chi''_{L'-1}\}$ through secure computation of a sum of products using the secret share values $\{\chi''_0\}, \ldots, \{\chi''_{L'-1}\}$ and $\{\eta_0\}, \ldots, \{\eta_{L'-1}\}$.
10: The secure computation unit converts and outputs the secret share value {φ} into the secret share value [φ]. φ is a truth value indicating whether msb of χ is an even bit. When msb of χ is an even bit, φ=1 and otherwise, φ=0.
11: The secure computation unit obtains and outputs a secret share value [x]=[ν'][ν'][φ?2χ:χ] through a secure computation using the secret share values $[v']$, $[\varphi]$, and $[\chi]$. Here, $\varphi?2\chi:\chi$ is $2\chi$ when $\varphi=1$ and $\chi$ when $\varphi=0$.

Square Root Reciprocal Protocol

Input: $[\chi]$

Output: $[1/\sqrt{\chi}]$

1: The secure computation unit obtains the secret share value $[x]$ of the value x obtained by normalizing the real number $\chi$ to $[0.5, 1)$ and secret share values $[v']$ and $[\varphi]$ required for reverse operation of the normalization through the reciprocal normalization protocol for the square root described above.

2: The secure computation unit obtains a secret share value $[\text{func}(x)]$ from the secret share value $[x]$ through secure computation using the method of the second embodiment, the third embodiment or the modification example thereof. Here, func(x) is a polynomial for approximating a reciprocal function of a square root of x. Further, in step S23, $\gamma$ is replaced with $\sqrt{2}\gamma$ when $\varphi=1$ (step S23'). Similarly, in step S32, $\gamma$ is replaced with $\sqrt{2}\gamma$ when $\varphi=1$ (step S32'). Details of processing of steps S23' and S32' will be described below.

3: The secure computation unit obtains and outputs a secret share value $[1/\sqrt{\chi}]=[\text{func}(x)][v]$ through secure computation using the secret share values $[\text{func}(x)]$ and $[v']$.

Processing content of steps S23' and S32' is illustrated hereinafter.

Case in Which Method of Second Embodiment Is Used (Step S23')

The secure computation unit executes steps S10, S11, and S22 of the second embodiment described above for the secret share value $[x]$ of the value x normalized to $[0.5, 1)$ as described above. Thereafter, the secure computation unit executes processing of step S232 below instead of step S23.

Step S232: The secure computation unit obtains and outputs a secret share value $[\text{func}(x)]=[(\sqrt{2})\gamma(z(\alpha z+d)+y(\beta x+f)+gx)]$ when $\varphi=1$ and a secret share value $[\text{func}(x)]=[\gamma(z(\alpha z+d)+y(\beta x+f)+gx)]$ when $\varphi=0$ through secure computation using the secret share values $[x]$, $[y]$, $[z]$, and $[\varphi]$.

The secure computation unit executes processing of step S232 as follows (steps S232a to S232c).

The secure computation unit uses multipliers $m_0=1$ and $m_1=\sqrt{2}$ and positive integers $\sigma 1$ and $\sigma 1$ to obtain and output public values $2^{\sigma 0}/m_0$ and $2^{\sigma 1}/m_1$. Here, $\sigma 1$ and $\sigma 1$ are positive integers that are the number of bits indicating a right shift amount required when multipliers $m_0$ and $m_1$ are large (step S232a).

The secure computation device performs secure computations of public value division $[\gamma(z(\alpha z+d)+y(\beta x+f)+gx)]/(2^{\sigma 0}/m_0)$ and $[\gamma(z(\alpha z+d)+y(\beta x+f)+gx)]/(2^{\sigma 1}/m_1)$ using the secret share values $[x]$, $[y]$, and $[z]$ and the public values $2^{\sigma 0}/m_0$ and $2^{\sigma 1}/m_1$ obtained in step S232a, to obtain and output a secret share value $[m_0\gamma(z(\alpha z+d)+y(\beta x+f)+gx)]_r$ of a value obtained by right-shifting $m_0\gamma(z(\alpha z+d)+y(\beta x+f)+gx)$ by $\sigma 0$ bits and a secret share value $[m_1\gamma(z(\alpha z+d)+y(\beta x+f)+gx)]_r$ of a value obtained by right-shifting $m_1\gamma(z(\alpha z+d)+y(\beta x+f)+gx)$ by $\sigma 1$ bits (step S232b).

The secure computation device obtains and outputs a secret share value $[\text{func}(x)]=[\varphi?m_0\gamma(z(\alpha z+d)+y(\beta x+f)+gx):m_1\gamma(z(\alpha z+d)+y(\beta x+f)+gx)]$ of $m_\varphi\gamma(z(\alpha z+d)+y(\beta x+f)+gx)$ through secure computation using the secret share values $[\varphi]$, $[m_0\gamma(z(\alpha z+d)+y(\beta x+f)+gx)]_r$, and $[m_1\gamma(z(\alpha z+d)+y(\beta x+f)+gx)]_r$. That is, the secure computation unit obtains and outputs $[\text{func}(x)]=[y(z(\alpha z+d)+y(\beta x+f)+gx)]$ when $\varphi=0$, and obtains and outputs $[\text{func}(x)]=[(\sqrt{2})\gamma(z(\alpha z+d)+y(\beta x+f)+gx)]$ when $\varphi=1$ (step S232c).

Case in which Method of Modification Example of Second Embodiment Is Used (Step S23')

The secure computation unit executes steps S10, S11, and S22 of the modification example of the second embodiment described above for the secret share value $[x]$ of the value x normalized to $[0.5, 1)$ as described above. Thereafter, the secure computation unit executes processing of step S232' below instead of step S23.

Step S232': The secure computation unit obtains a secret share value $[w'/\gamma]=[z(\alpha z+d-n/\gamma)+(\beta x+f-o/\gamma)y+(g-p)x+(H-q)/\gamma]$ through secure computation of a sum of products using the secret share values $[x]$, $[y]$, $[z]$, and $[\varphi]$, and performs multiplication by $(\sqrt{2})\gamma$ and lowering of a decimal point position when $\varphi=1$ and multiplication by $\gamma$ and lowering of the decimal point position when $\varphi=0$ to obtain the secret share value $[w']$. Further, the secure computation unit obtains a secret share value $[\text{func}(x)]=[w'+(nz+oy+px+q)]$ through secure computation using the secret share values $[w']$, $[x]$, $[y]$, and $[z]$.

The secure computation unit executes, for example, processing of step S232' as follows (steps S232a' to S232e').

The secure computation unit obtains a secret share value $[w'/\gamma]=[z(\alpha z+d-n/\gamma)+(\beta x+f-o/\gamma)y+(g-p)x+(H-q)/\gamma]$ through secure computation of a sum of products using the secret share values $[x]$, $[y]$, and $[z]$ (step S232a').

The secure computation unit uses multipliers $m_0=1$ and $m_1=\sqrt{2}$ and positive integers $\sigma 0$ and $\sigma 1$ to obtain and output public values $2^{\sigma 0}/m_0$ and $2^{\sigma 1}/m_1$ (step S232b').

The secure computation device performs secure computations $[w'/\gamma]/(2^{\sigma 0}/\gamma m_0)$ and $[w'/\gamma]/(2^{\sigma 1}/\gamma m_1)$ of public value division using the secret share value $[w'/\gamma]$ and the public values $2^{\sigma 0}/m_0$ and $2^{\sigma 1}/m_1$ obtained in step S232b' to obtain and output a secret share value $[m_0w']_r$ of a value obtained by right-shifting $m_0w'$ by $\sigma 0$ bits and a secret share value $[m_1w']_r$ of a value obtained by right-shifting $m_1w'$ by $\sigma 1$ bits (step S232c').

The secure computation device obtains and outputs the secret share value $[\text{func}(x)]=[\varphi?m_0w':m_1w']$ of $m_\varphi w'$ through secure computation using the secret share values $[\varphi]$, $[m_0w']_r$, and $[m_1w']_r$. That is, the secure computation unit obtains and outputs a secret share value $[\text{func}'(x)]=[w']$ when $\varphi=0$, and obtains and outputs a secret share value $[\text{func}'(x)]=[(\sqrt{2})w']$ when $\varphi=1$ (step S232d').

The secure computation unit obtains a secret share value $[\text{func}(x)]=[\text{func}'(x)+(nz+oy+px+q)]$ through secure computation using the secret share values $[\text{func}'(x)]$, $[x]$, $[y]$, and $[z]$ (step S232e').

Case in Which Method of Third Embodiment Is Used (Step S32')

The secure computation unit executes steps S10 and S11 of the third embodiment described above for the secret share value $[x]$ of the value x normalized to $[0.5, 1)$ as described above. Thereafter, the secure computation unit executes processing of step S323 below instead of step S32.

Step S323: The secure computation unit obtains and outputs a secret share value $[\text{func}(x)]=[(\sqrt{2})\gamma(y(\zeta y+b)+cx)]$ when $\varphi=1$ and the secret share value $[\text{func}(x)]=[\gamma(y(\zeta y+b)+cx)]$ when $\varphi=0$ through secure computation using the secret share values $[x]$, $[y]$, and $[\varphi]$.

The secure computation unit executes, for example, processing of step S323 as follows (steps S323a to S323c).

The secure computation unit uses multipliers $m_0=1$ and $m_1=\sqrt{2}$ and positive integers $\sigma 0$ and $\sigma 1$ to obtain and output public values $2^{\sigma 0}/m_0$ and $2^{\sigma 1}/m_1$ (step S323a).

The secure computation device performs secure computations $[\gamma(y(\zeta y+b)+cx)]/(2^{\sigma 0}/m_0)$ and $[\gamma(y(\zeta y+b)+cx)]/(2^{\sigma 1}/m_1)$ of public value division using the secret share values $[x]$ and [y] and the public values $2^{\sigma 0}/m_0$ and $2^{\sigma 1}/m_1$ obtained in step S323a, to obtain and output a secret share value $[m_0\gamma(y(\zeta y+b)+cx)]_r$ of a value obtained by right-shifting $m_0\gamma(y(\zeta y+b)+cx)$ by σ0 bits and a secret share value $[m_1\gamma(y(\zeta y+b)+cx)]_r$ of a value obtained by right-shifting $m_1\gamma(y(\zeta y+b)+cx)$ by σ1 bits (step S323b).

The secure computation device obtains and outputs a secret share value $[\varphi?m_0\gamma(y(\zeta y+b)+cx):m_1\gamma(y(\zeta y+b)+cx)]$ of $m_\varphi\gamma(y(\zeta y+b)+cx)$ through secure computation using the secret share values $[\varphi]$, $[m_0\gamma(y(\zeta y+b)+cx)]_r$, and $[m_1\gamma(y(\zeta y+b)+cx)]_r$. That is, the secure computation unit obtains and outputs $[\text{func}(x)]=[\gamma(y(\zeta y+b)+cx)]$ when $\varphi=0$, and $[\text{func}(x)]=[(\sqrt{2})\gamma(y(\zeta y+b)+cx)]$ when $\varphi=1$ (step S323c).

Case in which Method of Modification Example of Third Embodiment Is Used (Step S32')

The secure computation unit executes steps S10 and S11 of the modification example of the third embodiment described above for the secret share value [x] of the value x normalized to [0.5, 1) as described above. Thereafter, the secure computation unit executes processing of step S323' below instead of step S32.

Step S323': The secure computation unit obtains $[z'/\gamma]=[y(\zeta y+b-k/\gamma)+(c-s/\gamma)x-m/\gamma]$ through secure computation of a sum of products using the secret share values [x], [y], and $[\varphi]$, performs multiplication by $(\sqrt{2})\gamma$ and lowering of a decimal point position when $\varphi=1$ and multiplication by $\gamma$ and lowering of the decimal point position when $\varphi=0$ to obtain a secret share value [func'(x)]. The secure computation unit 32 obtains and outputs a secret share value [func(x)]=[func'(x)+(ky+sx+m)] through secure computation using the secret share value [func'(x)] and the secret share values [x] and [y].

The secure computation unit executes processing of step S323' as follows (steps S323a' to S323c').

The secure computation unit obtains $[z'/\gamma]=[y(\zeta y+b-k/\gamma)+(c-s/\gamma)x-m/\gamma]$ through secure computation of a sum of products using the secret share values [x] and [y] (step S323a').

The secure computation unit uses multipliers $m_0=1$ and $m_1=\sqrt{2}$ and positive integers σ0 and σ1 to obtain and output public values $2^{\sigma 0}/m_0$ and $2^{\sigma 1}/m_1$ (step S323b').

The secure computation unit performs secure computations $[w'/\gamma]/(2^{\sigma 0}/\gamma m_0)$ and $[w'/\gamma]/(2^{\sigma 1}/\gamma m_1)$ of public value division using the secret share value $[w'/\gamma]$ and the public values $2^{\sigma 0}/m_0$ and $2^{\sigma 1}/m_1$ obtained in step S323b' to obtain and output a secret share value $[m_0w']_r$ of a value obtained by right-shifting $m_0w'$ by σ0 bits and a secret share value $[m_1w']_r$ of a value obtained by right-shifting $m_1w'$ by σ1 bits (step S323c').

The secure computation device obtains and outputs the secret share value $[\text{func}(x)]=[\varphi?m_0w':m_1w']$ of $m_\varphi w'$ through secure computation using the secret share values $[\varphi]$, $[m_0w']_r$, and $[m_1w']_r$. That is, the secure computation unit obtains and outputs a secret share value [func'(x)]=[w'] when $\varphi=0$, and obtains and outputs a secret share value [func'(x)]=[$(\sqrt{2})$w'] when $\varphi=1$ (step S323d').

The secure computation unit obtains and outputs a secret share value [func(x)]=[func'(x)+(ky+sx+m)] through secure computation using the secret share values [func'(x)], [x], and [y] (step S323e').

EXAMPLE 3

Example of Square Root Function

In Example 3, a secret share value of a square root $\sqrt{\chi}$ of a real number $\chi$ is calculated. A reciprocal function of the square root is normalized to [1, 2) in the same way as the reciprocal function described above. In Example 3, the following modification is performed on the real number $\chi$.

$$\sqrt{\chi} = \frac{1}{\sqrt{2^e}}\sqrt{2^e\chi}$$

That is, processing of multiplying the real number $\chi$ by $2^e$ so that the real number $\chi$ is normalized, obtaining a square root $\sqrt{(2^e\chi)}$ of $2^e\chi$, and then, dividing the square root by $\sqrt{(2^e)}$ is performed in secure computation.

Normalization Protocol for Square Root

Input: $[\chi]$
Output: [x], $[\varphi]$, [v']

Here, when a decimal point position in a case in which $\chi$ is expressed in binary is ι, x is a value obtained by moving msb of $\chi$ to a position of τ. In Example 3, φ is a truth value indicating whether a calculated value needs to be divided by $\sqrt{2}$ at the end. v' is a power of 2 to be multiplied at the end.

1: The secure computation device obtains secret share values $\{\chi_0\}, \ldots, \{\chi_{L-1}\}$ of bit representations $\chi_0, \ldots, \chi_{L-1}$ corresponding to the bit sequence $\chi_0 \ldots \chi_{L-1}$ in a case in which $\chi$ is expressed in binary through bit decomposition by secure computation using the secret share value $[\chi]$.

2: The secure computation device obtains secret share values $\{\eta_0\}, \ldots, \{\eta_{L-1}\}$ of the msb flag sequence $\eta_0, \ldots, \eta_{L-1}$ in which a bit $\eta_{msb}$ corresponding to a most significant bit (msb) $\chi_{msb}$ of a bit sequence $\chi_0 \ldots \chi_{L-1}$ is 1 and bits $\eta\xi(\xi \in \{0, \ldots, L-1\})$ other than the bit $\eta_{msb}$ are 0, through secure computation using the secret share values $\{\chi_0\}, \ldots, \{\chi_{L-1}\}$. This processing is the same as in step S46 described above.

3: The secure computation device obtains L'=ceil(L/2). Here, ceil is a ceiling function.

4: The secure computation device obtains a secret share value $\{\omega_i\}=\{\eta_{2i}\}$ (XOR) $\{\eta_{2i+1}\}$ where each i<L' through secure computation using the secret share values $\{\eta_0\}, \ldots, \{\eta_{L-1}\}$. Here, when L is an odd number, $\{\omega_{L'-1}\}=\{\eta_{2i}\}$.

5: The secure computation device obtains a secret share value $\{\varphi\}=\{\eta_1\}$ (XOR) $\{\eta_3\}$ (XOR) $\{\eta_5\}$ (XOR) ... through secure computation using the secret share values $\{\eta_0\}, \ldots, \{\eta_{L-1}\}$. When it is necessary to divide a calculated value by $\sqrt{2}$ at the end, $\varphi=1$, and when it is not necessary to divide the calculated value by $\sqrt{2}$ at the end, $\varphi=0$.

6: The secure computation device converts the secret share value $\{\varphi\}$ into the secret share value $[\varphi]$.

7: The secure computation device connects $\{\omega_0\}, \ldots, \{\omega_{L'-1}\}$ through bit connection by secure computation using the secret share values $\{\omega_0\}, \{\omega_1\}, \{\omega_2\}, \ldots, \{\omega_{L'-1}\}$, to obtain and output [v'].

8: The secure computation device connects $\{\eta_{L-1}\}, \ldots, \{\eta_0\}$ through secure computation using the secret share values $\{\eta_0\}, \ldots, \{\eta_{L-1}\}$, to obtain and output [v].

9: The secure computation device obtains and outputs a secret share value $[x]=[\chi][v]$ through secure computation using the secret share values $[\chi]$ and [v].

Square Root Protocol

Input: $[\chi]$
Output: $[\sqrt{\chi}]$

1: The secure computation device obtains a secret share value [x] of a value x obtained by normalizing the real number $\chi$ to [1, 2) through the above-described normalization protocol for square root, and secret share values $[v']$ and $[\varphi]$ required for reverse operation of the normalization.

2: The secure computation device obtains L'=ceil(L/2).

3: The secure computation device sets $\varphi'=\sqrt{2}$ when L is odd number, and $\varphi'=1$ when L is even number.

4: The secure computation unit obtains a secret share value $[\text{func}(x)]$ from the secret share value $[x]$ through secure computation using the method of the second embodiment, the third embodiment or the modification example thereof. Here, func(x) is a polynomial for approximating a square root function of x. Further, in step S23, $\gamma$ is replaced with $\gamma\varphi'/\sqrt{2}$ when $\varphi=1$, and $\gamma$ is replaced with $\gamma\varphi'$ when $\varphi=0$ (step S23"). Similarly, in step S32, $\gamma$ is replaced with $(\varphi'/\sqrt{2})\gamma$ when $\varphi=1$, and $\gamma$ is replaced with $\varphi'\gamma$ when $\varphi=0$ (step S32"). Details of processing of steps S23" and S32" will be described below.

5: The secure computation unit obtains and outputs a secret share value $[\sqrt{\chi}]=[\text{func}(x)][v']$ through secure computation using the secret share values $[\text{func}(x)]$ and $[v']$.

Processing content of steps S23" and S32" is illustrated hereinafter.

Case in Which Method of Second embodiment Is Used (Step S23")

The secure computation unit executes steps S10, S11, and S22 of the second embodiment described above for the secret share value $[x]$ of the value x normalized to $[1, 2)$ as described above. Thereafter, the secure computation unit executes processing of step S234 below instead of step S23.

Step S234: The secure computation unit obtains and outputs a secret share value $[\text{func}(x)]=[(\gamma\varphi'/\sqrt{2})(z(\alpha z+d)+y(\beta x+f)+gx)]$ when $\varphi=1$ and obtains and outputs the secret share value $[\text{func}(x)]=[\gamma\varphi'(z(\alpha z+d)+y(\beta x+f)+gx)]$ when $\varphi=0$, through secure computation using the secret share values $[x]$, $[y]$, $[z]$, and $[\varphi]$.

The secure computation unit executes, for example, processing of step S234 as follows (steps S234a to S234c).

The secure computation unit obtains and outputs public values $2^{\sigma 0}/m_0$ and $2^{\sigma 1}/m_1$ using multipliers $m_0=\varphi'$ and $m_1=\varphi'/\sqrt{2}$ and positive integers $\sigma 0$ and $\sigma 1$ (step S234a).

The secure computation device performs secure computations $[\gamma(z(\alpha z+d)+y(\beta x+f)+gx)]/(2^{\sigma 0}/m_0)$ and $[\gamma(z(\alpha z+d)+y(\beta x+f)+gx)]/(2^{\sigma 1}/m_1)$ of public value division using the secret share values $[x]$, $[y]$, and $[z]$ and the public values $2^{\sigma 0}/m_0$ and $2^{\sigma 1}/m_1$ obtained in step S234a, to obtain and output a secret share value $[m_0\gamma(z(\alpha z+d)+y(\beta x+f)+gx)]_r$ of a value obtained by right-shifting $m_0\gamma(z(\alpha z+d)+y(\beta x+f)+gx)$ by $\sigma 0$ bits and a secret share value $[m_1\gamma(z(\alpha z+d)+y(\beta x+f)+gx)]_r$ of a value obtained by right-shifting $m_1\gamma(z(\alpha z+d)+y(\beta x+f)+gx)$ by $\sigma 1$ bits (step S234b).

The secure computation device obtains and outputs a secret share value $[\text{func}(x)]=[\varphi?m_0\gamma(z(\alpha z+d)+y(\beta x+f)+gx):m_1\gamma(z(\alpha z+d)+y(\beta x+f)+gx)]$ of $m_\varphi\gamma(z(\alpha z+d)+y(\beta x+f)+gx)$ through secure computation using the secret share values $[\varphi]$, $[m_0\gamma(z(\alpha z+d)+y(\beta x+f)+gx)]_r$, and $[m_1\gamma(z(\alpha z+d)+y(\beta x+f)+gx)]_r$. That is, the secure computation unit obtains and outputs $[\text{func}(x)]=[\varphi'\gamma(z(\alpha z+d)+y(\beta x+f)+gx)]$ when $\varphi=0$, and obtains and outputs $[\text{func}(x)]=[(\varphi'/\sqrt{2})\gamma(z(\alpha z+d)+y(\beta x+f)+gx)]$ when $\varphi=1$ (step S234c).

Case in which Method of Modification Example of Second Embodiment Is Used (Step S23")

The secure computation unit executes steps S10, S11, and S22 of the modification example of the second embodiment described above for the secret share value $[x]$ of the value x normalized to $[1, 2)$ as described above. Thereafter, the secure computation unit executes processing of step S234' below instead of step S23.

Step S234': The secure computation unit obtain a secret share value $[w'/\gamma]=[z(\alpha z+d-n/\gamma)+(\beta x+f-o/\gamma)y+(g-p)x+(H-q)/\gamma]$ through secure computation of a sum of products using the secret share values $[x]$, $[y]$, $[z]$, and $[\varphi]$, and performs multiplication by $\gamma\varphi'/\sqrt{2}$ and lowering of a decimal point position when $\varphi=1$ and multiplication by $\gamma\varphi'$ and lowering of the decimal point position when $\varphi=0$ to obtain the secret share value $[w']$. Further, the secure computation unit obtains a secret share value $[\text{func}(x)]=[w'+(nz+oy+px+q)]$ through secure computation using the secret share values $[w']$, $[x]$, $[y]$, and $[z]$.

The secure computation unit executes, for example, processing of step S234' as follows (steps S234a' to S234e').

The secure computation unit obtains a secret share value $[w'/\gamma]=[z(\alpha z+d-n/\gamma)+(\beta x+f-o/\gamma)y+(g-p)x+(H-q)/\gamma]$
through secure computation of a sum of products using the secret share values $[x]$, $[y]$, and $[z]$ (step S234a').

The secure computation unit obtains and outputs public values $2^{\sigma 0}/m_0$ and $2^{\sigma 1}/m_1$ using multipliers $m_0=\varphi'$ and $m_1=\varphi'/\sqrt{2}$ and positive integers $\sigma 0$ and $\sigma 1$ (step S234b').

The secure computation device performs secure computations $[w'/\gamma]/(2^{\sigma 0}/\gamma m_0)$ and $[w'/\gamma]/(2^{\sigma 1}/\gamma m_1)$ of public value division using the secret share value $[w'/\gamma]$ and the public values $2^{\sigma 0}/m_0$ and $2^{\sigma 1}/m_1$ obtained in step S234b' to obtain and output a secret share value $[m_0w']_r$ of a value obtained by right-shifting $m_0w'$ by $\sigma 0$ bits and a secret share value $[m_1w']_r$ of a value obtained by right-shifting $m_1w'$ by $\sigma 1$ bits (step S234c').

The secure computation device obtains and outputs the secret share value $[\text{func}(x)]=[\varphi?m_0w':m_1w']$ of $m_\varphi w'$ through secure computation using the secret share values $[\varphi]$, $[m_0w']_r$, and $[m_1w']_r$. That is, the secure computation unit obtains and outputs a secret share value $[\text{func}'(x)]=[\varphi'w']$ when $\varphi=0$, and obtains and outputs a secret share value $[\text{func}'(x)]=[(\varphi'/\sqrt{2})w']$ when $\varphi=1$ (step S234d').

The secure computation unit obtains a secret share value $[\text{func}(x)]=[\text{func}'(x)+(nz+oy+px+q)]$ through secure computation using the secret share values $[\text{func}'(x)]$, $[x]$, $[y]$, and $[z]$ (step S234e').

Case in which Method of Third Embodiment Is Used (Step S32")

The secure computation unit executes steps S10 and S11 of the third embodiment described above for the secret share value $[x]$ of the value x normalized to $[1, 2)$ as described above. Thereafter, the secure computation unit executes processing of step S325 below instead of step S32.

Step S325: The secure computation unit obtains and outputs a secret share value $[\text{func}(x)]=[(\varphi'/\sqrt{2})\gamma(y(\zeta y+b)+cx)]$ when $\varphi=1$ and the secret share value $[\text{func}(x)]=[\varphi'\gamma(y(\zeta y+b)+cx)]$ when $\varphi=0$ through secure computation using the secret share values $[x]$, $[y]$, and $[\varphi]$.

The secure computation unit executes processing of step S325 as follows (steps S325a to S325c).

The secure computation unit obtains and outputs public values $2^{\sigma 0}/m_0$ and $2^{\sigma 1}/m_1$ using multipliers $m_0=\varphi'$ and $m_1=\varphi'/\sqrt{2}$ and positive integers $\sigma 0$ and $\sigma 1$ (step S325a).

The secure computation device performs secure computations $[\gamma(y(\zeta y+b)+cx)]/(2^{\sigma 0}/m_0)$ and $[\gamma(y(\zeta y+b)+cx)]/(2^{\sigma 1}/m_1)$ of public value division using the secret share values $[x]$ and $[y]$ and the public values $2^{\sigma 0}/m_0$ and $2^{\sigma 1}/m_1$ obtained in step S325a, to obtain and output a secret share value $[m_0\gamma(y(\zeta y+b)+cx)]_r$ of a value obtained by right-shifting $m_0\gamma(y(\zeta y+b)+cx)$ by $\sigma 0$ bits and a secret share value $[m_1\gamma(y(\zeta y+b)+cx)]_r$ of a value obtained by right-shifting $m_1\gamma(y(\zeta y+b)+cx)$ by $\sigma 1$ bits (step S325b).

The secure computation device obtains and outputs a secret share value $[\varphi?m_0\gamma(y(\zeta y+b)+cx):m_1\gamma(y(y+b)+cx)]$ of $m_\varphi\gamma(y(\zeta y+b)+cx)$ through secure computation using the secret share values $[\varphi]$, $[m_0\gamma(y(y+b)+cx)]_r$, and $[m_1\gamma(y(\zeta y+b)+cx)]_r$. That is, the secure computation unit obtains and outputs $[\text{func}(x)]=[\varphi'\gamma(y(\zeta y+b)+cx)]$ when $\varphi=0$, and $[\text{func}(x)]=[\varphi'/(\sqrt{2})\gamma(y(\zeta y+b)+cx)]$ when $\varphi=1$ (step S325c).

Case in which Method of Modification Example of Third Embodiment Is Used (Step S32")

The secure computation unit executes steps S10 and S11 of the modification example of the third embodiment described above for the secret share value [x] of the value x normalized to [1, 2) as described above. Thereafter, the secure computation unit executes processing of step S325' below instead of step S32.

Step S325': The secure computation unit obtains $[z'/\gamma]=[y(\zeta y+b-k/\gamma)+(c-s/\gamma)x-m/\gamma]$ through secure computation of a sum of products using the secret share values [x], [y], and [$\varphi$], performs multiplication by $\varphi'/(\sqrt{2})\gamma$ and lowering of a decimal point position when $\varphi=1$ and multiplication by $\varphi'\gamma$ and lowering of the decimal point position when $\varphi=0$ to obtain a secret share value [func'(x)]. The secure computation unit 32 obtains and outputs a secret share value [func(x)]=[func'(x)+(ky+sx+m)] through secure computation using the secret share value [func'(x)] and the secret share values [x] and [y].

The secure computation unit, for example, executes processing of step S325' as follows (steps S325a' to S325c').

The secure computation unit obtains $[z'/\gamma]=[y(\zeta y+b-k/\gamma)+(c-s/\gamma)x-m/\gamma]$ through secure computation of a sum of products using the secret share values [x] and [y] (step S325a').

The secure computation unit obtains and outputs public values $2^{\sigma 0}/m_0$ and $2^{\sigma 1}/m_1$ using multipliers $m_0=\varphi'$ and $m_1=\varphi'/\sqrt{2}$ and positive integers $\sigma 0$ and $\sigma 1$ (step S325b').

The secure computation unit performs secure computations $[w'/\gamma]/(2^{\sigma 0}/\gamma m_0)$ and $[w'/\gamma]/(2^{\sigma 1}/\gamma m_1)$ of public value division using the secret share value $[w'/\gamma]$ and the public values $2^{\sigma 0}/m_0$ and $2^{\sigma 1}/m_1$ obtained in step S325b' to obtain and output a secret share value $[m_0 w']_r$ of a value obtained by right-shifting $m_0 w'$ by $\sigma 0$ bits and a secret share value $[m_1 w']_r$ of a value obtained by right-shifting $m_1 w'$ by $\sigma 1$ bits (step S325c').

The secure computation device obtains and outputs the secret share value $[\text{func}(x)]=[\varphi?m_0 w':m_1 w']$ of $m_\varphi w'$ through secure computation using the secret share values $[\varphi]$, $[\varphi']$, $[m_0 w']_r$, and $[m_1 w']_r$. That is, the secure computation unit obtains and outputs a secret share value [func'(x)]=[$\varphi'w'$] when $\varphi=0$, and obtains and outputs a secret share value [func'(x)]=[($\varphi'/\sqrt{2})w'$] when $\varphi=1$ (step S325d').

The secure computation unit obtains and outputs a secret share value [func(x)]=[func'(x)+(ky+sx+m)] through secure computation using the secret share values [func'(x)], [x], and [y] (step S325e').

EXAMPLE 4

Example of Exponential Function

In Example 4, a secret share value of an exponential function value exp(x) of a real number x is calculated. Because the exponential function has additivity to an input, the input is decomposed into the following three parts.

I. Minimum expected input $\mu$

II. u higher bits $x_0, \ldots, x_{u-1}$ equal to or higher than t bits after a decimal point of $x-\mu$ III. Number $x_\rho$ indicated by all lower bits than $x_0$ of $x-\mu$
$\exp x = \exp \mu \exp 2^{-t}x_0, \ldots, \exp 2^{u-t-1}x_{u-1} \exp x_\rho$. $\exp \mu$ is a public value, $\exp 2^{-t}x_0, \ldots, \exp 2^{u-t-1}x_{u-1}$ is a table calculation. $\exp x_\rho$ is a part to be calculated through approximation and is normalized to $[0, 2^{-t})$.

Input: [x]
Output: [exp(x)]
Set parameters: t=−1
1: The secure computation device obtains [x']=[x]−$\mu$ through secure computation. Here, $\mu$ is a minimum value of x that is assumed.
2: The secure computation device extracts bits higher than t bits after a decimal point through bit decomposition in secure computation and performs mod p conversion to obtain $[x'_0], \ldots, [x'_{u-1}]$.
3: The secure computation device sets $f_i$ and $\varepsilon_i$ as a mantissa part and an exponential part of $\exp(2^{i-t})$, where $0 \le i < u$, through secure computation.
4: The secure computation device obtains $$[f'] = \left[\prod_{0 \le i \le u-1} F_i\right]$$

in which $F_i=1$ when $x'_i=0$ and $F_i=f_i$ when $x'_i=1$ for $i=0, \ldots, u-1$ through secure computation.
5: The secure computation device calculates $[\varepsilon'_i]=$ if $[x'_i]$ then $2^{\varepsilon i}$ else 1 through if-then-else gate of option disclosure where $0 \le i < u$ through secure computation.
6: The secure computation device obtains a product [$\varepsilon'$] of [$\varepsilon'_i$] regarding each i through secure computation ($\varepsilon'=\varepsilon'_0 \ldots \varepsilon'_{u-1}$). This is a power of 2 in an exponential part of a high-order bit part of exp(x').
7: The secure computation device obtains $$[x'_\rho] = [x'] - \sum_{i<u} 2^{i-t}[x'_1]$$

through secure computation. This is a number indicated by a low-order bit part of exp(x').
8: The secure computation device obtains a secret share value [w]=[func(x)] from the secret share value [x'$_\rho$] through secure computation. Here, w=func(x) is a polynomial for approximating an exponential function exp x of x. The secure computation device uses, for example, the methods of the first to third embodiments or the modification example thereof to obtain a secret share value [w]=[func(x)] in which x=x'$_\rho$.
9: The secure computation device obtains and outputs [w][f'][$\varepsilon'$]exp($\mu$) through secure computation. For example, the secure computation device obtains a public value of $2^\sigma/\exp(\mu)$ through secure computation, and performs secure computation [w][f'][$\varepsilon'$]/($2^\sigma/\exp(\mu)$) of public value division using the secret share value [w][f'][$\varepsilon'$] and the obtained public value $2^\sigma/\exp(\mu)$, to obtain and output a secret share value [w][f'][$\varepsilon'$]exp($\mu$) of a value obtained by right-shifting wf'$\varepsilon'$exp($\mu$) by $\alpha$ bits.

Example of Calculated Parameters Regarding Each Elementary Function

FIG. 6 illustrates calculated parameters in a case in which an elementary function is a reciprocal function, a square root function, a reciprocal function of a square root, an exponential function, and a logarithmic function. ex, ey, and ez indicate decimal point positions of x, y, and z, respectively. Further, e'x, e'y, and e'z indicate decimal point positions of x', y', and z' before right shift, respectively. These decimal point positions indicate bit positions of the decimal point positions counted from the lower bits. A value indicating this bit position starts from 0, and when an e1-st bit counted from a lower bit indicates 1, a decimal point position is represented as e1.

Hardware Configuration

The secure computation devices 1 to 4 in the respective embodiments and the secure computation devices in the respective examples are, for example, devices configured by a general-purpose or dedicated computer including a processor (a hardware processor) such as a central processing unit (CPU), a memory such as a random access memory (RAM) and a read only memory (ROM), and the like executing a predetermined program. This computer may include one processor and memory or may include a plurality of processors and memories. This program may be installed in a computer or may be recorded in a ROM or the like in advance. Further, a part or all of processing units may be configured by using an electronic circuit that implements a processing function alone, instead of an electronic circuit (circuitry) that implements a functional configuration by a program being read, like a CPU. Further, an electronic circuit constituting one device may include a plurality of CPUs.

Figure 7:
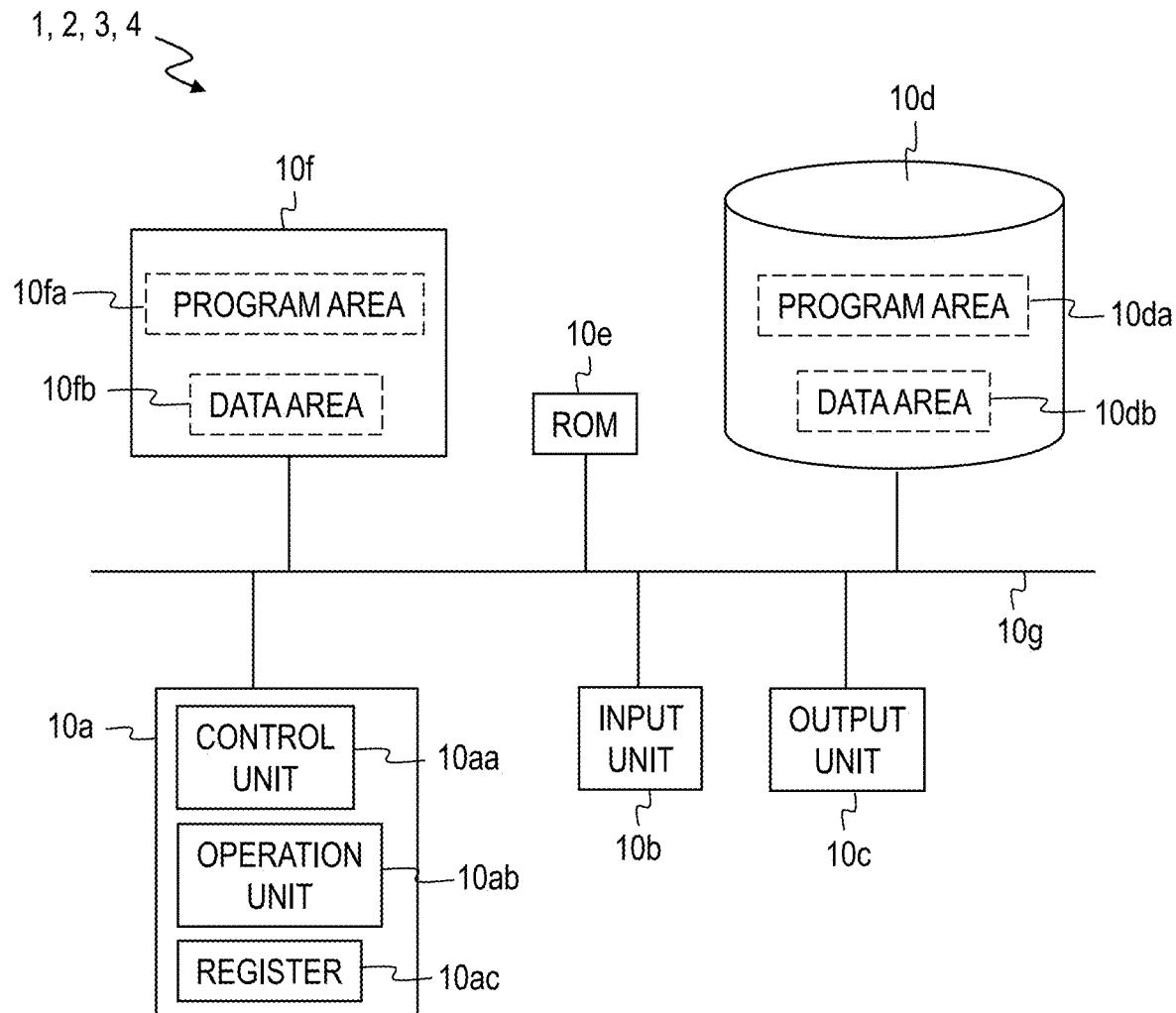
FIG. 7 is a block diagram illustrating a hardware configuration.

FIG. 5 is a block diagram illustrating hardware configurations of the secure computation devices 1 to 4 in the respective embodiments and the secure computation devices in the respective examples. As illustrated in FIG. 7, the secure computation devices 1 to 4 of this example include a central processing unit (CPU) 10$a$, an input unit 10$b$, an output unit 10$c$, a random access memory (RAM) 10$d$, and a read only memory (ROM) 10$e$, an auxiliary storage device 10$f$, and a bus 10$g$. The CPU 10$a$ of this example includes a control unit 10$aa$, an operation unit 10$ab$, and a register 10$ac$, and executes various pieces of operation processing according to various programs read into the register 10$ac$. Further, the output unit 10$c$ is an output terminal, a display, or the like on which data is output. Further, the output unit 10$c$ is a LAN card or the like controlled by the CPU 10$a$ that has read a predetermined program. Further, the RAM 10$d$ is a static random access memory (SRAM), a dynamic random access memory (DRAM), or the like, and has a program area 10$da$ in which a predetermined program is stored and a data area 10$db$ in which various types of data is stored. Further, the auxiliary storage device 10$f$ is, for example, a hard disk, a magneto-optical disc (MO), a semiconductor memory, or the like, and has a program area 10$fa$ in which a predetermined program is stored and a data area 10$fb$ in which various types of data is stored. Further, the bus 10$g$ connects the CPU 10$a$, the input unit 10$b$, the output unit 10$c$, the RAM 10$d$, the ROM 10$e$, and the auxiliary storage device 10$f$ so that information can be exchanged. The CPU 10$a$ writes the program stored in the program area 10$fa$ of the auxiliary storage device 10$f$ to the program area 10$da$ of the RAM 10$d$ according to a read operating system (OS) program. Similarly, the CPU 10$a$ writes various types of data stored in the data area 10$fb$ of the auxiliary storage device 10$f$ to the data area 10$db$ of the RAM 10$d$. An address on the RAM 10$d$ in which this program or data is written is stored in the register 10$ac$ of the CPU 10$a$. The control unit 10$ab$ of the CPU 10$a$ sequentially reads out these addresses stored in the register 10$ac$, reads a program or data from the area on the RAM 10$d$ indicated by the read address, causes the operation unit 10$ab$ to sequentially execute operations indicated by the program, and stores operation results in the register 10$ac$. With such a configuration, functional configurations of the secure computation devices 1 to 4 illustrated in FIGS. 1 to 4 and the secure computation devices in the respective examples are implemented.

The above-described program can be recorded on a computer-readable recording medium. An example of the computer-readable recording medium is a non-transitory recording medium. Examples of such a recording medium are a magnetic recording device, an optical disc, a photomagnetic recording medium, and a semiconductor memory.

Distribution of this program is performed, for example, by selling, transferring, or renting a portable recording medium such as a DVD or CD-ROM on which the program has been recorded. Further, this program may be distributed by being stored in a storage device of a server computer and transferred from the server computer to another computer via a network. As described above, the computer that executes such a program first temporarily stores, for example, the program recorded on the portable recording medium or the program transferred from the server computer in a storage device of the computer. When the computer executes the processing, the computer reads the program stored in the storage device of the computer and executes processing according to the read program. Further, as another form of execution of the program, the computer may directly read the program from the portable recording medium and execute the processing according to the program, and further, the processing according to the received program may be sequentially executed each time the program is transferred from the server computer to the computer. Further, a configuration in which the above-described processing may be executed by a so-called application service provider (ASP) type service that implements a processing function only by an execution instruction and result acquisition without transferring the program from the server computer to the computer. It is assumed that the program in the present embodiment includes information provided for processing of an electronic calculator and being pursuant to the program (such as data that is not a direct command to the computer, but has properties defining processing of the computer).

In each embodiment, although the present device is configured by a predetermined program being executed on the computer, at least a part of processing content of thereof may be implemented by hardware.

The present disclosure is not limited to the above-described embodiments. For example, the present disclosure may be used in a case in which secure computation is performed on elementary functions other than those shown in the specific examples. Further, various types of processing described above may be not only executed in chronological order according to the description but may also be executed in parallel or individually according to a processing capacity of a device that executes the processing or as necessary. In addition, it is obvious that change can be made appropriately without departing from the spirit of the present disclosure.

INDUSTRIAL APPLICABILITY

The present disclosure can be used, for example, for calculation of an elementary function such as a reciprocal function, a square root function, an exponential function, and a logarithmic function in machine learning and data mining performed in secure computation while concealing data.

REFERENCE SIGNS LIST 1 to 4 Secure computation device

The invention claimed is:

1. A secure computation device for secure computation while concealing data, wherein x, y, and z are real numbers, a, b, c, δ, and ζ are real number coefficients, and a secret share value of · is [·], the secure computation device comprising:
processing circuitry configured to:
obtain a secret share value $[y]=[\delta x^2+ax]$ through the secure computation using a secret share value [x] of the real number x; and
obtain and output a secret share value $[\text{func}(x)]=[y(\zeta y+b)+cx]$ of an elementary function approximation value $z=\text{func}(x)$ of the real number x through the secure computation using the secret share value [x] and the secret share value [y],
wherein the secret share value $[\text{func}(x)]=[y(\zeta y+b)+cx]$ is obtained through the secure computation while concealing data of the secure computation,
wherein a number of digits that the processing circuitry can handle is finite, and
wherein the secret share value [func(x)] does not overflow the processing circuitry.

2. A secure computation device for secure computation while concealing data, wherein x, y, z, and w are real numbers, a, b, c, d, f, g, α, β, γ, δ, and ζ are real number coefficients, and a secret share value of · is [·], the secure computation device comprising:
processing circuitry configured to:
obtain a secret share value $[y]=[\delta x^2+ax]$ through the secure computation using a secret share value [x] of the real number x;
obtain a secret share value $[z]=[y(\zeta y+b)+cx]$ through the secure computation using the secret share value [x] and the secret share value [y]; and
obtain and output a secret share value $[\text{func}(x)]=[\gamma(z(\alpha z+d)+y(\beta x+f)+gx)]$ of an elementary function approximation value $w=\text{func}(x)$ of the real number x through the secure computation using the secret share value [x], the secret share value [y], and the secret share value [z],
wherein the secret share value $[\text{func}(x)]=[\gamma(z(\alpha z+d)+y(\beta x+f)+gx)]$ is obtained through the secure computation while concealing data of the secure computation,
wherein a number of digits that the processing circuitry can handle is finite, and
wherein the secret share value [func (x)] does not overflow the processing circuit.

3. A secure computation device for secure computation while concealing data, wherein x, y, and z are real numbers, a, b, c, γ, δ, and ζ are real number coefficients, and a secret share value of · is [·], the secure computation device comprising:
processing circuitry configured to:
obtain a secret share value $[y]=[\delta x^2+ax]$ through the secure computation using a secret share value [x] of the real number x; and
obtain and output a secret share value $[\text{func}(x)]=[\gamma(y(\zeta y+b)+cx)]$ of an elementary function approximation value $z=\text{func}(x)$ of the real number x through the secure computation using the secret share value [x] and the secret share value [y],
wherein the secret share value $[\text{func}(x)]=[\gamma(y(\zeta y+b)+cx)]$ is obtained through the secure computation while concealing data of the secure computation,
wherein a number of digits that the processing circuitry can handle is finite, and
wherein the secret share value [func (x)] does not overflow the processing circuitry.

4. The secure computation device according to claim 1, wherein
the secret share value [x] is related to χ, p, and L,
χ is a real number, p is a positive integer, L is an integer equal to or greater than 2, [·] is a secret share value obtained by performing linear secret sharing on an element · on a quotient ring modulo p, and {·} is a secret share value obtained by performing linear secret sharing on an element · on a quotient ring modulo 2, and
the processing circuitry is further configured to:
obtain secret share values $\{\chi_0\}, \ldots, \{\chi_{L-1}\}$ of an L-bit representation $\chi_0 \ldots \chi_{L-1}$ of the real number χ through the secure computation using a secret share value [χ] of the real number χ;
obtain secret share values $\{\eta_0\}, \ldots, \{\eta_{L-1}\}$ of an msb flag sequence $\eta_0, \ldots, \eta_{L-1}$ where a bit $\eta_{msb}$ corresponding to a most significant bit $\chi_{msb}$ of a bit sequence $\chi_0 \ldots \chi_{L-1}$ is 1 and bits $\eta_\xi (\xi \in \{0, \ldots, L-1\})$ other than the bit $\eta_{msb}$ are 0 through the secure computation using the secret share values $\{\chi_0\}, \ldots, \{\chi_{L-1}\}$;
obtain a secret share value $\{\rho_i\}=\{\rho_{i+1} V \chi_i\}$ where $0 \le i < L-1$ and a secret share value $\{\rho_{L-1}\}=\{\chi_{L-1}\}$ through the secure computation using the secret share values $\{\chi_0\}, \ldots, \{\chi_{L-1}\}$;
obtain a secret share value [θ] of a count value θ indicating the number of elements being 1 among $\rho_0, \ldots, \rho_{L-1}$ through the secure computation using secret share values $\{\rho_0\}, \ldots, \{\rho_{L-1}\}$;
obtain a secret share value [ν] of an msb flag value $\nu=\eta_0 \ldots \eta_{L-1}$ obtained by bit-connecting the msb flag sequence $\eta_0, \ldots, \eta_{L-1}$ through the secure computation using the secret share values $\{\eta_0\}, \ldots, \{\eta_{L-1}\}$;
obtain the secret share value $[x]=[\chi][\nu]$ through the secure computation using the secret share value [χ] and the secret share value [ν]; and
obtain and output $[\log \chi]=[\text{func}(x)]-[\theta]$ through the secure computation using the secret share value [func(x)] and the secret share value [θ].

5. A secure computation method for secure computation while concealing data, wherein x, y, and z are real numbers, a, b, c, δ, and ζ are real number coefficients, and a secret share value of · is [·], the secure computation method, performed by processing circuitry, comprising:
obtaining a secret share value $[y]=[\delta x^2+ax]$ through the secure computation using a secret share value [x] of the real number x; and
obtaining and outputting a secret share value $[\text{func}(x)]=[y(\zeta y+b)+cx]$ of an elementary function approximation value $z=\text{func}(x)$ of the real number x through the secure computation using the secret share value [x] and the secret share value [y],
wherein the secret share value $[\text{func}(x)]=[y(\zeta y+b)+cx]$ is obtained through the secure computation while concealing data of the secure computation,
wherein a number of digits that the processing circuitry can handle is finite, and
wherein the secret share value [func(x)] does not overflow the processing circuitry.

6. A secure computation method for secure computation while concealing data, wherein x, y, z, and w are real numbers, a, b, c, d, f, g, α, β, γ, δ, and ζ are real number coefficients, and a secret share value of · is [·], the secure computation method, performed by processing circuitry, comprising:

obtaining a secret share value $[y]=[\delta x^2+ax]$ through the secure computation using a secret share value $[x]$ of the real number x;

obtaining a secret share value $[z]=[y(\zeta y+b)+cx]$ through the secure computation using the secret share value $[x]$ and the secret share value $[y]$; and obtaining and outputting a secret share value $[func(x)]=[\gamma(z(\alpha z+d)+y(\beta x+f)+gx)]$ of an elementary function approximation value $w=func(x)$ of the real number x through the secure computation using the secret share value $[x]$, the secret share value $[y]$, and the secret share value $[z]$, wherein the secret share value $[func(x)]=[\gamma(z(\alpha z+d)+y(\beta x+f)+gx)]$ is obtained through the secure computation while concealing data of the secure computation, wherein a number of digits that the processing circuitry can handle is finite, and wherein the secret share value $[func(x)]$ does not overflow the processing circuitry.

7. A secure computation method for secure computation while concealing data, wherein x, y, and z are real numbers, a, b, c, γ, δ, and ζ are real number coefficients, and a secret share value of · is [·], the secure computation method, performed by processing circuitry, comprising:

obtaining a secret share value $[y]=[\delta x^2+ax]$ through the secure computation using a secret share value $[x]$ of the real number x; and obtaining and outputting a secret share value $[func(x)]=[\gamma(y(\zeta y+b)+cx)]$ of an elementary function approximation value $z=func(x)$ of the real number x through the secure computation using the secret share value $[x]$ and the secret share value $[y]$, wherein the secret share value $[func(x)]=[\gamma(y(\zeta y+b)+cx)]$ is obtained through the secure computation while concealing data of the secure computation, wherein a number of digits that the processing circuitry can handle is finite, and wherein the secret share value $[func(x)]$ does not overflow the processing circuitry.

8. A non-transitory computer-readable recording medium storing a program for causing a computer to perform the method of claim 5.

9. The secure computation device according to claim 2, wherein the secret share value $[x]$ is related to χ, p, and L, χ is a real number, p is a positive integer, L is an integer equal to or greater than 2, $[\cdot]$ is a secret share value obtained by performing linear secret sharing on an element · on a quotient ring modulo p, and $\{\cdot\}$ is a secret share value obtained by performing linear secret sharing on an element · on a quotient ring modulo 2, and the processing circuitry is further configured to:

obtain secret share values $\{\chi_0\}, \ldots, \{\chi_{L-1}\}$ of an L-bit representation $\chi_0 \ldots \chi_{L-1}$ of the real number χ through the secure computation using a secret share value $[\chi]$ of the real number x;

obtain secret share values $\{\eta_0\}, \ldots, \{\eta_{L-1}\}$ of an msb flag sequence $\eta_0, \ldots, \eta_{L-1}$ where a bit $\eta_{msb}$ corresponding to a most significant bit $\chi_{msb}$ of a bit sequence $\chi_0 \ldots \chi_{L-1}$ is 1 and bits $\eta\xi(\xi \in \{0, \ldots, L-1\})$ other than the bit $\eta_{msb}$ are 0, through the secure computation using the secret share values $\{\chi_0\}, \ldots, \{\chi_{L-1}\}$;

obtain a secret share value $\{\rho_i\}=\{\rho_{i+1}V_{\chi i}\}$ where $0\leq i<L-1$ and a secret share value $\{\rho_{L-1}\}=\{\chi_{L-1}\}$ through the secure computation using the secret share values $\{\chi_0\}, \ldots, \{\chi_{L-1}\}$;

obtain a secret share value $[\theta]$ of a count value θ indicating the number of elements being 1 among $\rho_0, \ldots, \rho_{L-1}$ through the secure computation using secret share values $\{\rho_0\}, \ldots, \{\rho_{L-1}\}$;

obtain a secret share value $[v]$ of an msb flag value $v=\eta_0 \ldots \eta_{L-1}$ obtained by bit-connecting the msb flag sequence $\eta_0, \ldots, \eta_{L-1}$ through the secure computation using the secret share values $\{\eta_0\}, \ldots, \{\eta_{L-1}\}$;

obtain the secret share value $[x]=[\chi][v]$ through the secure computation using the secret share value $[\chi]$ and the secret share value $[v]$; and obtain and output $[\log \chi]=[func(x)]-[\theta]$ through the secure computation using the secret share value $[func(x)]$ and the secret share value $[\theta]$.

10. The secure computation device according to claim 3, wherein the secret share value $[x]$ is related to χ, p, and L, χ is a real number, p is a positive integer, L is an integer equal to or greater than 2, $[\cdot]$ is a secret share value obtained by performing linear secret sharing on an element · on a quotient ring modulo p, and $\{\cdot\}$ is a secret share value obtained by performing linear secret sharing on an element · on a quotient ring modulo 2, and the processing circuitry is further configured to:

obtain secret share values $\{\chi_0\}, \ldots, \{\chi_{L-1}\}$ of an L-bit representation $\chi_0 \ldots \chi_{L-1}$ of the real number χ through the secure computation using a secret share value $[\chi]$ of the real number x;

obtain secret share values $\{\eta_0\}, \ldots, \{\eta_{L-1}\}$ of an msb flag sequence $\eta_0, \ldots, \eta_{L-1}$ where a bit $\eta_{msb}$ corresponding to a most significant bit $\chi_{msb}$ of a bit sequence $\chi_0 \ldots \chi_{L-1}$ is 1 and bits $\eta\xi(\xi \in \{0, \ldots, L-1\})$ other than the bit $\eta_{msb}$ are 0 through the secure computation using the secret share values $\{\chi_0\}, \ldots, \{\chi_{L-1}\}$;

obtain a secret share value $\{\rho_i\}=\{\rho_i+V_{\chi i}\}$ where $0\leq i<L-1$ and a secret share value $\{\rho_{L-1}\}=\{\chi_{L-1}\}$ through the secure computation using the secret share values $\{\chi_0\}, \ldots, \{\chi_{L-1}\}$;

obtain a secret share value $[\theta]$ of a count value θ indicating the number of elements being 1 among $\rho_0, \ldots, \rho_{L-1}$ through the secure computation using secret share values $\{\rho_0\}, \ldots, \{\rho_{L-1}\}$;

obtain a secret share value $[v]$ of an msb flag value $v=\eta_0 \ldots \eta_{L-1}$ obtained by bit-connecting the msb flag sequence $\eta_0, \ldots, \eta_{L-1}$ through the secure computation using the secret share values $\{\eta_0\}, \ldots, \{\eta_{L-1}\}$;

obtain the secret share value $[x]=[\chi][v]$ through the secure computation using the secret share value $[\chi]$ and the secret share value $[v]$; and obtain and output $[\log \chi]=[func(x)]-[\theta]$ through the secure computation using the secret share value $[func(x)]$ and the secret share value $[\theta]$.

11. A non-transitory computer-readable recording medium storing a program for causing a computer to perform the method of claim 6.

12. A non-transitory computer-readable recording medium storing a program for causing a computer to perform the method of claim 7.

\* \* \* \* \*

UNITED STATES PATENT AND TRADEMARK OFFICE
CERTIFICATE OF CORRECTION

| | | |
|---|---|---|
| PATENT NO. | : 12,452,042 B2 | Page 1 of 1 |
| APPLICATION NO. | : 17/791907 | |
| DATED | : October 21, 2025 | |
| INVENTOR(S) | : Dai Ikarashi | |

It is certified that error appears in the above-identified patent and that said Letters Patent is hereby corrected as shown below:

On the Title Page

Item (71) Applicant: the Applicant name should be corrected from "NTT, INC." to --NTT, Inc.--

Signed and Sealed this
Twenty-fifth Day of November, 2025

John A. Squires
*Director of the United States Patent and Trademark Office*